(12) United States Patent
Miyata

(10) Patent No.: US 9,160,873 B2
(45) Date of Patent: Oct. 13, 2015

(54) INFORMATION PROCESSING SYSTEM CONTROLLING IMAGE PROCESSING APPARATUS TO DISPLAY SCREEN INFORMATION, CONTROL METHOD THEREFOR, EXTERNAL CONTROL APPARATUS, INFORMATION PROVISION APPARATUS, IMAGE PROCESSING APPARATUS, AND STORAGE MEDIUM STORING PROGRAM

(75) Inventor: Junichi Miyata, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 453 days.

(21) Appl. No.: 12/963,046

(22) Filed: Dec. 8, 2010

(65) Prior Publication Data

US 2011/0161823 A1 Jun. 30, 2011

(30) Foreign Application Priority Data

Dec. 24, 2009 (JP) ................................. 2009-292789

(51) Int. Cl.
G06F 3/048 (2013.01)
H04N 1/00 (2006.01)
(Continued)

(52) U.S. Cl.
CPC ....... *H04N 1/00464* (2013.01); *H04N 1/00204* (2013.01); *H04N 1/00212* (2013.01);
(Continued)

(58) Field of Classification Search
CPC .......... H04N 1/00464; H04N 1/00204; H04N 1/00212; H04N 1/00244; H04N 1/00474; H04N 1/00482; H04N 2201/001; H04N 2201/0094; H04N 2201/3205; H04N 2201/3208; H04N 2201/3219; H04N 3201/3273
USPC ................................................ 715/733, 744
See application file for complete search history.

(56) References Cited

U.S. PATENT DOCUMENTS 6,247,048 B1 * 6/2001 Greer et al. .................... 709/219
7,168,086 B1 * 1/2007 Carpenter et al. .............. 725/98
(Continued)

FOREIGN PATENT DOCUMENTS

JP 10-161947 A 6/1998
JP 2004-185464 A 7/2004
(Continued)

OTHER PUBLICATIONS

Japanese Office Action in Japanese counterpart application No. JP2009-292789, dated Jan. 7, 2014.

*Primary Examiner* — Tuyetlien Tran
(74) *Attorney, Agent, or Firm* — Rossi, Kimms & McDowell LLP

(57) ABSTRACT

An information processing system capable of maintaining the flexibility for constructing an information provision apparatus, and of reducing load on the information provision apparatus. An image processing apparatus requests screen information from an information provision apparatus via an external control apparatus, receives the screen information from the information provision apparatus in response to a request, and displays the screen information received. The external control apparatus receives the request from the image processing apparatus, transfers it to the information provision apparatus, receives the screen information transmitted from the information provision apparatus in response to the request transferred, changes a content of the screen information received, and transmits the screen information changed to the image processing apparatus. The information provision apparatus receives the request from the image processing apparatus via the external control apparatus, generates the screen information, and transmits the screen information generated to the external control apparatus.

10 Claims, 20 Drawing Sheets

(51) Int. Cl.
*G06F 3/0484* (2013.01)
*H04L 29/08* (2006.01)

(52) U.S. Cl.
CPC ....... *H04N1/00244* (2013.01); *H04N 1/00474* (2013.01); *H04N 1/00482* (2013.01); *G06F 3/048* (2013.01); *G06F 3/0484* (2013.01); *H04L 67/02* (2013.01); *H04N 2201/001* (2013.01); *H04N 2201/0094* (2013.01); *H04N 2201/3205* (2013.01); *H04N 2201/3208* (2013.01); *H04N 2201/3219* (2013.01); *H04N 2201/3273* (2013.01)

(56) References Cited

U.S. PATENT DOCUMENTS

| | | | |
|---|---|---|---|
| 2002/0062325 A1* | 5/2002 | Berger et al. | 707/518 |
| 2004/0015484 A1* | 1/2004 | Debaty | 707/3 |
| 2004/0078473 A1* | 4/2004 | Itabashi et al. | 709/228 |
| 2004/0190035 A1* | 9/2004 | Ozawa et al. | 358/1.13 |
| 2005/0114767 A1* | 5/2005 | Sato | 715/527 |
| 2005/0135854 A1* | 6/2005 | Ferlitsch | 399/403 |
| 2006/0056871 A1* | 3/2006 | Kim | 399/81 |
| 2006/0164675 A1* | 7/2006 | Yamada et al. | 358/1.15 |
| 2006/0290948 A1* | 12/2006 | Ferlitsch | 358/1.1 |
| 2008/0150952 A1* | 6/2008 | Koarai | 345/531 |
| 2008/0270911 A1* | 10/2008 | Dantwala et al. | 715/741 |
| 2008/0307319 A1* | 12/2008 | Iwata et al. | 715/748 |

FOREIGN PATENT DOCUMENTS

| | | |
|---|---|---|
| JP | 2004-318842 A | 11/2004 |
| JP | 2006-121614 A | 5/2006 |
| JP | 2006-129356 A | 5/2006 |
| JP | 2008-177821 A | 7/2008 |

* cited by examiner

FIG.7A

GET /HTTP /1.1
Accept : image/ gif, image /jpeg, */*
Accept - Language : ja
User -Agent: MFP
Host : xxx.yyy.zzz     1201

FIG.7B

GET /HTTP /1.1
Accept : image/ gif, image /jpeg, */*
Accept - Language : ja
User -Agent: RIPServer 1
Host : xxx.yyy.zzz     1202

FIG.8A

```
< HTML>
< HEAD></HEAD >
< BODY >
...                                                    1001
< DIV class="RIPServer -Reference -Control">
< A href="">
< IMG src="Button .gif" HEIGHT =40 WIDTH =40 >
< /A>
< /DIV>
...
< /BODY >
< /HTML>
```

1002 points to the `< IMG ...>` line.
1001 points to the `< DIV ...>` line.

FIG.8B

```
<HTML>
<HEAD></ HEAD>
<BODY >
...
<DIV class=" RIPServer-Reference -Control">
<A href="http ://RIPServer 1.xxx .yyy.zzz ">
<IMG src="Button .gif " HEIGHT= 40 WIDTH =40>
</A>
</DIV>
...
</BODY >
</HTML >
```

1003 points to the `<IMG ...>` line.

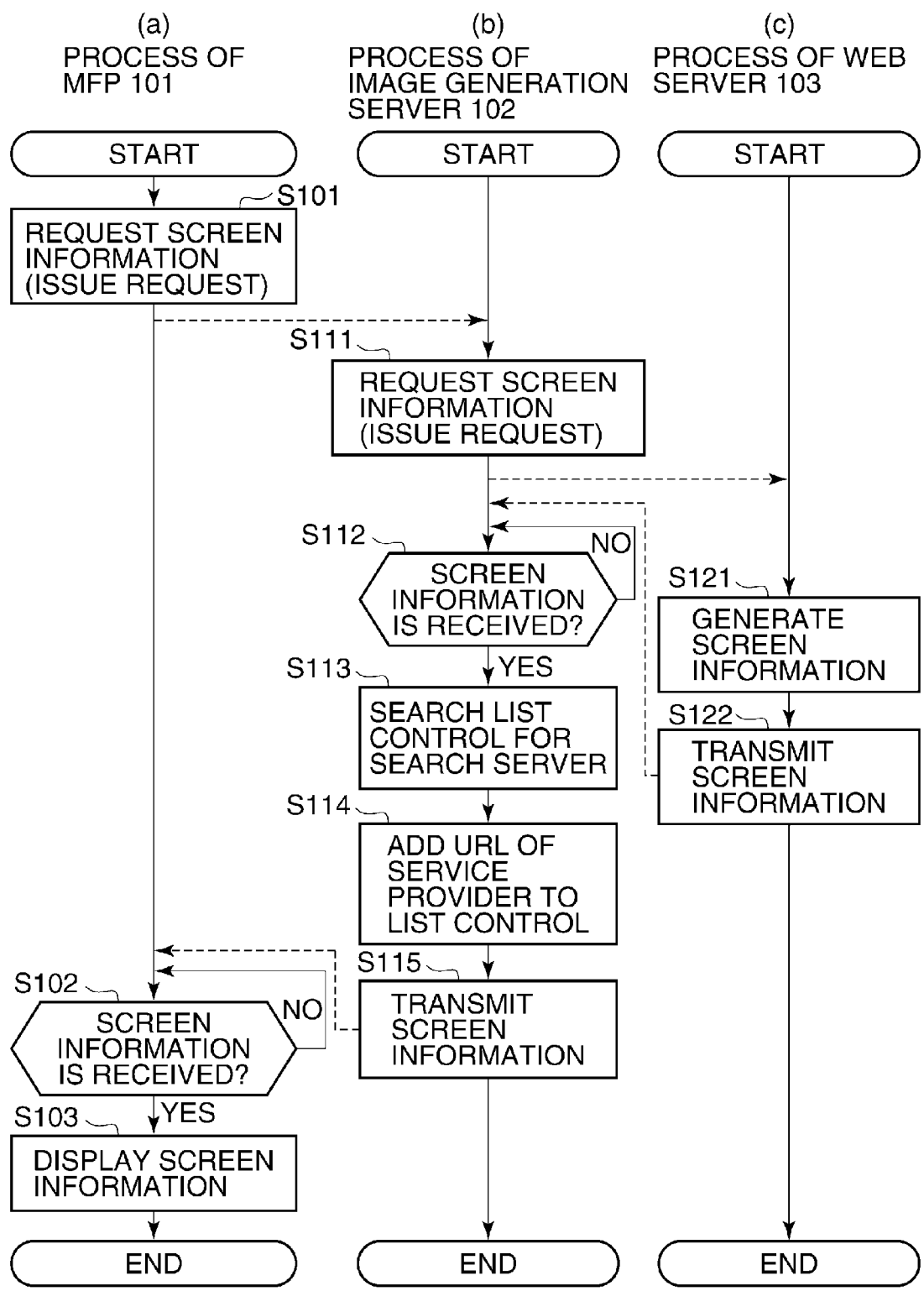

FIG.16A

```
<HTML>
<HEAD></ HEAD>
<BODY >
...
<FORM>                                          1601
<DIV class=" RIPServer-Control" >
<SELECT name =" SearchServer ">                  1602
<OPTION >Server1.xxx .yyy.zzz </OPTION >
</DIV>
</FORM>
...
</BODY >
</HTML >
```

FIG.16B

```
<HTML >
<HEAD>< /HEAD>
<BODY >
...
<FORM>
<DIV class ="RIPServer-Control ">
<SELECT name ="SearchServer ">
<OPTION >Server1. xxx.yyy. zzz</OPTION >      1603
<OPTION >RIPServer1 .xxx. yyy.zzz< /OPTION>
</DIV >
</FORM>
...
</BODY >
</HTML >
```

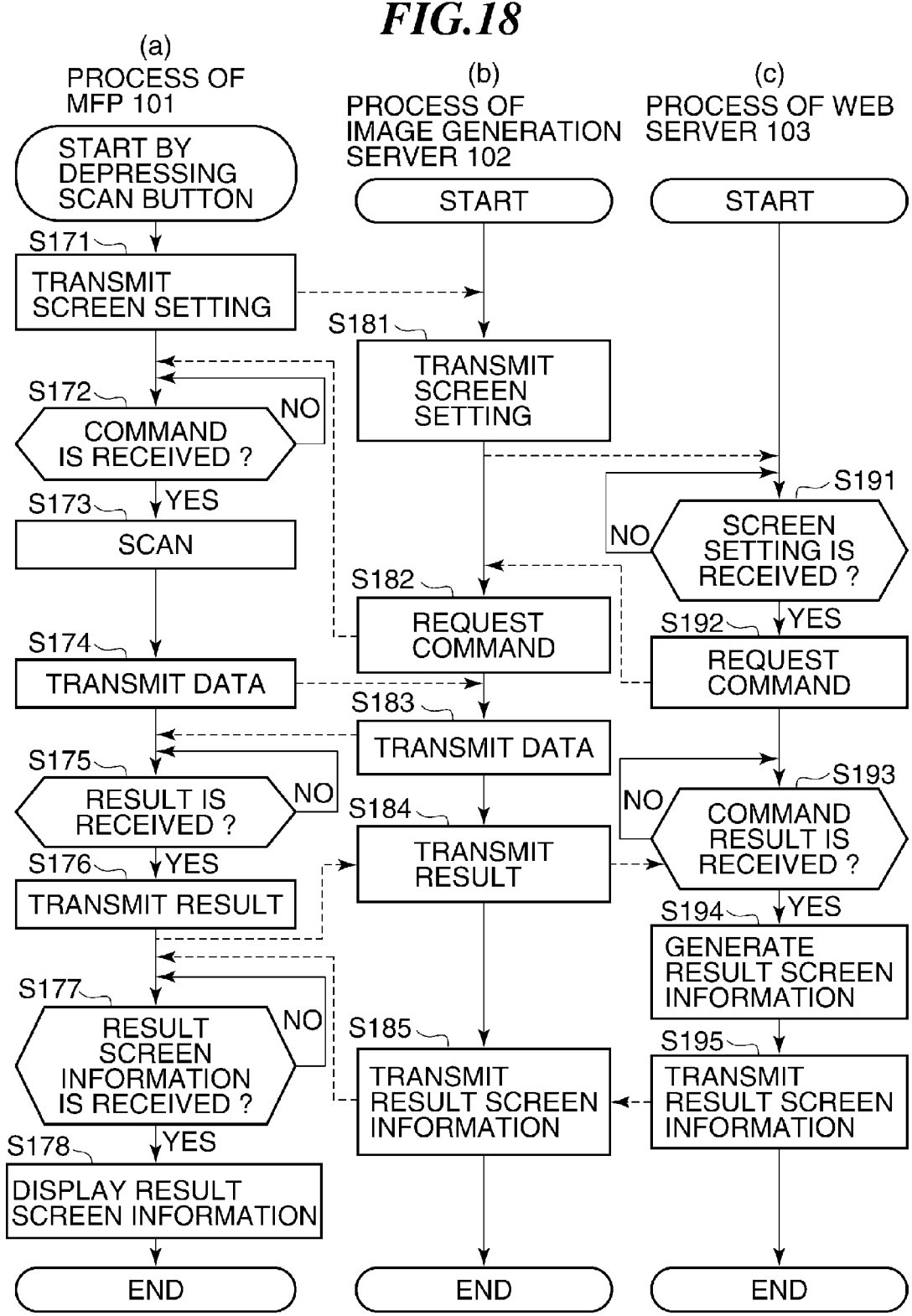

INFORMATION PROCESSING SYSTEM CONTROLLING IMAGE PROCESSING APPARATUS TO DISPLAY SCREEN INFORMATION, CONTROL METHOD THEREFOR, EXTERNAL CONTROL APPARATUS, INFORMATION PROVISION APPARATUS, IMAGE PROCESSING APPARATUS, AND STORAGE MEDIUM STORING PROGRAM

BACKGROUND OF THE INVENTION

1. Field of the Invention

The present invention relates to an information processing system controlling an image processing apparatus to display screen information, a control method therefor, an external control apparatus, an information provision apparatus, the image processing apparatus, and a storage medium storing a program.

2. Description of the Related Art

Conventionally, there is a known technique that an information processing apparatus like a personal computer is connected to a Web server on a network and displays an operation screen provided by the Web server on a Web browser with which the information processing apparatus is equipped.

With the technique, when the web browser of the information processing apparatus requests an operation screen from the Web server, a Web application of the Web server transmits an HTML file for displaying the operation screen on the Web browser to the information processing apparatus in response to the request from the information processing apparatus.

The Web browser of the information processing apparatus analyzes the received HTML file, and displays the operation screen based on descriptions of the received HTML file. Furthermore, when a user inputs instructions through the operation screen displayed on the Web browser, the Web browser notifies the Web server of the inputted instructions.

Receiving the notification, the Web application on the Web server executes processes according to the inputted instructions.

Incidentally, there are some image processing apparatuses, such as an MFP (Multi Function Peripheral) equipped with a scanner and a printer, which are equipped with the Web browser mentioned above recently. This MFP displays the operation screen provided by the Web server on the web browser of the MFP using the above-mentioned procedure, and receives the various instructions from a user.

Furthermore, a system in which an information processing apparatus (an external control apparatus) is separately arranged outside an MFP to take charge of a part of processes that has been executed by the MFP conventionally is proposed in recent years.

A RIP (Raster Image Processor), which develops printing data in a vector format into bitmap data that can be printed by the MFP and transmits the data to the MFP, is an example of such an information processing apparatus.

The system configuration of the MFP including the RIP is diversified. The Web server had to generate the optimal display screen corresponding to the system configuration of this complicated MFP.

A method of generating the display screen corresponding to the system configuration of the MFP is disclosed in Japanese Laid-Open Patent Publication (Kokai) No. 2006-129356 (JP 2006-129356A), for example. According to the description of this publication, the Web browser in the MFP notifies the Web server of functions with which the MFP is equipped, and the Web server dynamically generates a user interface corresponding to the functions of the MFP.

However, the above-mentioned conventional information processing system has the following problem. With the conventional technique of linking the Web browser in the MFP to the Web server, the Web browser notifies the Web server of the functional information about the MFP, and the Web server dynamically changes the generated screen information according to the functional information.

However, in the complex system configuration including the information processing apparatus like the RIP mentioned above and the MFP, the Web server needs to prepare many pieces of screen information corresponding to various functions of apparatuses including the information processing apparatus beforehand in order for the Web server to generate the screen information dynamically.

For example, when an operation of the information processing apparatus like the RIP is set up via the operation screen of the MFP, a user's convenience can be improved. Since such settings for the RIP vary widely, if the Web server supports all the settings, flexibility for constructing the Web server is spoiled and a load on the Web server increases.

SUMMARY OF THE INVENTION

The present invention provides an information processing system, a control method therefor, an external control apparatus, an information provision apparatus, an image processing apparatus, and a storage medium storing a program, which are capable of maintaining the flexibility for constructing the information provision apparatus, and of reducing the load on the information provision apparatus.

Accordingly, a first aspect of the present invention provides an information processing system comprising an image processing apparatus including a screen information request unit configured to request screen information that is displayed on the image processing apparatus from an information provision apparatus via an external control apparatus, a first information reception unit configured to receive the screen information that is provided by the information provision apparatus in response to a screen information request from the screen information request unit via the external control apparatus, and a display unit configured to display the screen information received by the first information reception unit; the external control apparatus including a first request reception unit configured to receive the screen information request from the image processing apparatus, a request transfer unit configured to transfer the screen information request that is received by the first request reception unit to the information provision apparatus, a second information reception unit configured to receive the screen information transmitted from the information provision apparatus in response to the screen information request that is transferred by the request transfer unit, an information change unit configured to change a content of the screen information that is received by the second information reception unit, and a first information transmission unit configured to transmit the screen information that is changed by the information change unit to the image processing apparatus; the information provision apparatus including a second request reception unit configured to receive the screen information request from the image processing apparatus via the external control apparatus, a generation unit configured to generate the screen information that is displayed on the image processing apparatus in response to the screen information request that is received by the second request reception unit, and a second information transmission unit configured to transmit the screen information that is generated by the generation unit to the external control apparatus.

Accordingly, a second aspect of the present invention provides an external control apparatus that can communicate with an image processing apparatus and an information provision apparatus, comprising a request reception unit configured to receive a request of screen information that is displayed on the image processing apparatus from the image processing apparatus concerned, a request transfer unit configured to transfer a screen information request that is received by the request reception unit to the information provision apparatus, an information reception unit configured to receive the screen information transmitted from the information provision apparatus in response to the screen information request that is transferred by the request transfer unit, an information change unit configured to change a content of the screen information that is received by the information reception unit, and an information transmission unit configured to transmit the screen information that is changed by the information change unit to the image processing apparatus.

Accordingly, a third aspect of the present invention provides an image processing apparatus that is connected to a network via an external control apparatus and can communicate with an information provision apparatus on the network, comprising a screen information request unit configured to request screen information that is displayed on the image processing apparatus from the information provision apparatus via the external control apparatus, an information reception unit configured to receive the screen information that is transmitted from the information provision apparatus in response to a request by the screen information request unit and is changed in a content by the external control apparatus, and a display unit configured to display the screen information received by the information reception unit.

Accordingly, a fourth aspect of the present invention provides an information provision apparatus, comprising a request reception unit configured to receive a screen information request from an image processing apparatus via an external control apparatus, a generation unit configured to generate screen information that can be changed by the external control apparatus in response to the screen information request, and an information transmission unit configured to transmit the screen information that is generated by the generation unit to the external control apparatus.

Accordingly, a fifth aspect of the present invention provides a control method for an information processing system comprising a screen information request step of requesting screen information that is displayed on an image processing apparatus from an information provision apparatus via an external control apparatus, a first information reception step of receiving the screen information that is provided by the information provision apparatus in response to a screen information request in the screen information request step via the external control apparatus, and a display step of displaying the screen information received in the first information reception step, which are executed in the image processing apparatus; a first request reception step of receiving the screen information request from the image processing apparatus, a request transfer step of transferring the screen information request that is received in the first request reception step to the information provision apparatus, a second information reception step of receiving the screen information transmitted from the information provision apparatus in response to the screen information request that is transferred in the request transfer step, an information change step of changing a content of the screen information that is received in the second information reception step, and a first information transmission step of transmitting the screen information that is changed in the information change step to the image processing apparatus, which are executed in the external control apparatus; a second request reception step of receiving the screen information request from the image processing apparatus via the external control apparatus, a generation step of generating the screen information that is displayed on the image processing apparatus in response to the screen information request that is received in the second request reception step, and a second information transmission step of transmitting the screen information that is generated in the generation step to the external control apparatus, which are executed in the external control apparatus.

Accordingly, a sixth aspect of the present invention provides a non-transitory computer-readable storage medium storing a control program causing a computer to execute the above-mentioned control method.

According to the information processing system of the present invention, the external control apparatus changes contents of the screen information received from the information provision apparatus. Accordingly, the flexibility of constructing the information provision apparatus is maintained and the load on the information provision apparatus is reduced.

Further features of the present invention will become apparent from the following description of exemplary embodiments with reference to the attached drawings.

BRIEF DESCRIPTION OF THE DRAWINGS

FIG. 7A and FIG. 7B are views showing examples of HTTP requests issued by the Web browser in FIG. 5 where identifiers are embedded in User-Agent attributes of headers thereof.

FIG. 8A is a view showing an example of an HTML file generated by the Web server in FIG. 5.

FIG. 8B is a view showing an example of the HTML file rewritten by an image generation server in FIG. 5.

FIG. 15 is a flowchart showing a display procedure of screen information when a "search transmitting destination" button in the screen shown in FIG. 14A has been depressed.

FIG. 16A is a view showing a partial example of an HTML file generated by the Web server in step S121 in FIG. 15.

FIG. 16B is a view showing a partial example of an HTML file changed in step S114 in FIG. 15.

FIG. 18 is a flowchart showing a display procedure of screen information when a "scan" button in the screen shown in FIG. 14E has been depressed.

DESCRIPTION OF THE EMBODIMENTS

Embodiments of an information processing system, a control method therefor, an external control apparatus, an information provision apparatus, an image processing apparatus, and a program according to the present invention will be described with reference to the drawings. This embodiment shows an example of the information processing system that employs a printing apparatus as an example of the image processing apparatus.

In the information processing system of a first embodiment, an MFP requests screen information that should be displayed on an operation screen of the MFP from a Web server via a network. The Web server generates the requested screen information. An image generation server relays communication between the MFP and the Web server, embeds a URL (Uniform Resource Locator) of a Web page in which operations of the image generation server are set up into the screen information generated by the Web server to allow an access to the URL from the operation panel of the MFP. It should be noted that the Web server and the image generation server are simply called a Web server (an information provision apparatus) and an image generation server (an external control apparatus), respectively.

Figure 1:
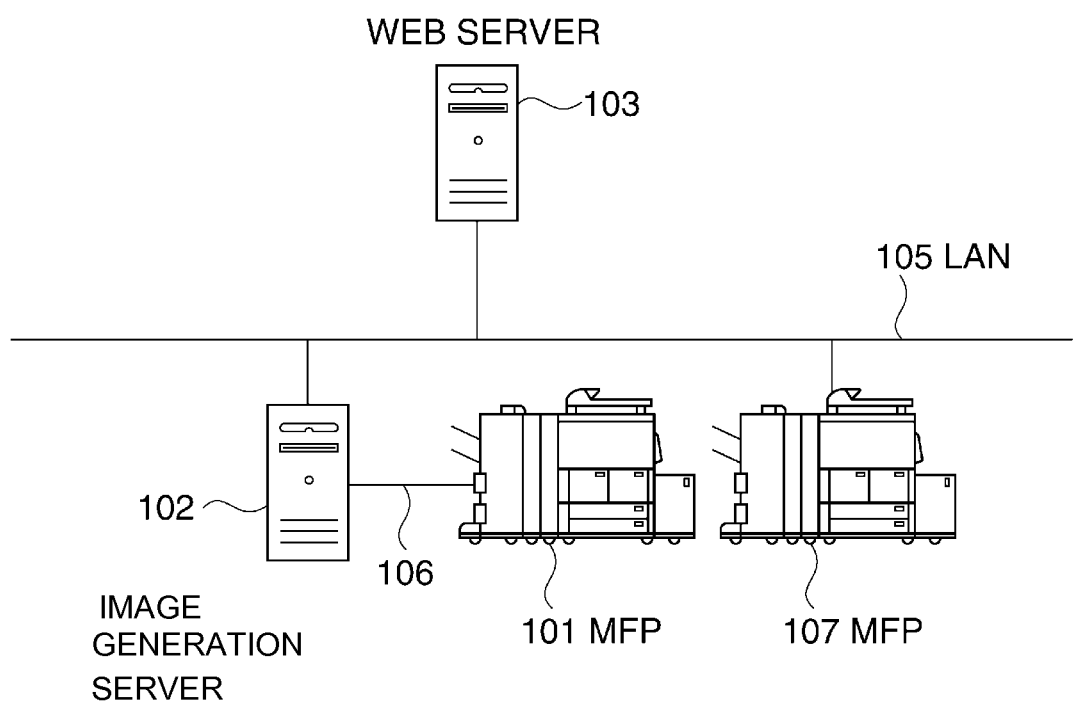
FIG. 1 is a view showing the entire configuration of an information processing system according to a first embodiment of the present invention.

FIG. 1 is a view showing the entire configuration of the information processing system according to the first embodiment. An image generation server 102, a Web server 103, and an MFP 107 are connected to a LAN (Local Area Network) 105 so that mutual communication is possible. Moreover, an MFP 101 and the image generation server 102 are connected via a local network 106 so that mutual communication is possible. The MFP 101 is connected to the LAN 105 through the image generation server 102 so that communication is possible. It should be noted that other information processing apparatuses (not shown) are connectable with the LAN 105.

Figure 2:
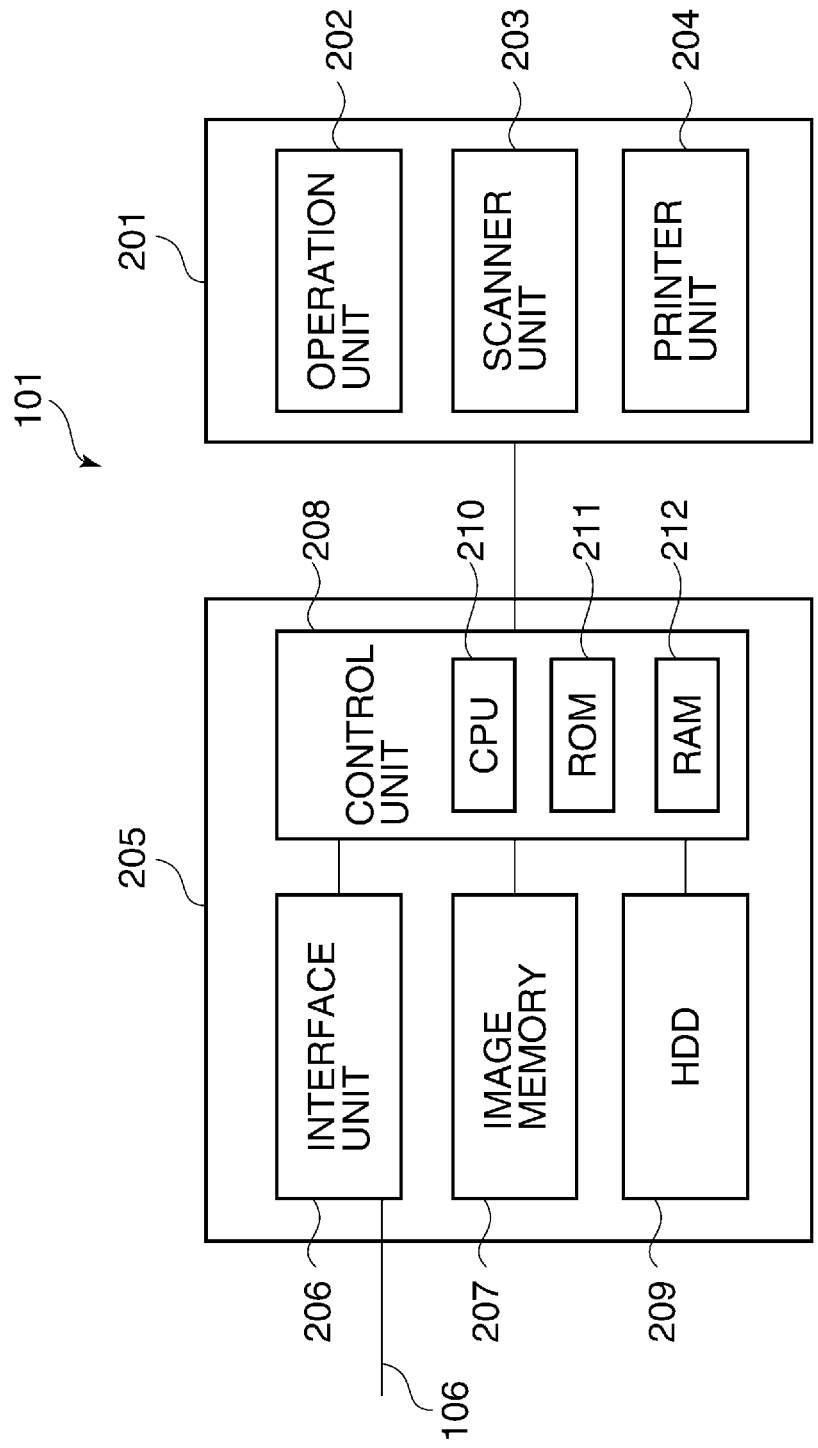
FIG. 2 is a block diagram schematically showing a configuration of an MFP shown in FIG. 1.

FIG. 2 is a block diagram schematically showing a configuration of the MFP 101 shown in FIG. 1. The MFP 101 consists of a controller section 205 and a function section 201.

A control unit 208 includes a CPU 210, a ROM 211, and a RAM 212, and controls operations of the entire MFP 101. The CPU 210 reads a control program stored in the ROM 211 and executes various control processes such as reading control and transmission control. The RAM 212 is used as a main memory of the CPU 210 and a temporary memory area such as a work area. A HDD 209 stores image data and various programs.

Moreover, the control unit 208 is connected with the function section 201 and controls operations of an operation unit 202, a scanner unit 203, and a printer unit 204. The operation unit 202 is equipped with a liquid crystal display unit having a touch-panel function, a keyboard, etc. Furthermore, the operation unit 202 is equipped with a Web browser function mentioned later. The Web browser of the MFP 101 analyzes an HTML file received from the image generation server 102, and displays an operation screen based on descriptions of the received HTML file on the operation unit 202.

The printer unit 204 prints image data, which is inputted from the control unit 208 so as to be printed, onto a recording medium (a paper medium). The scanner unit 203 reads an image of an original, generates image data, and outputs it to the control unit 208. The control unit 208 is connected to the local network 106 via the interface unit 206, receives the image data and information for printing from the image generation server 102, and receives the screen data (screen information) that is displayed on the operation unit 202.

It should be noted that the image data for printing received from the image generation server 102 is temporarily stored in the image memory 207, and is printed by the printer unit 204 through the control unit 208.

Figure 3:
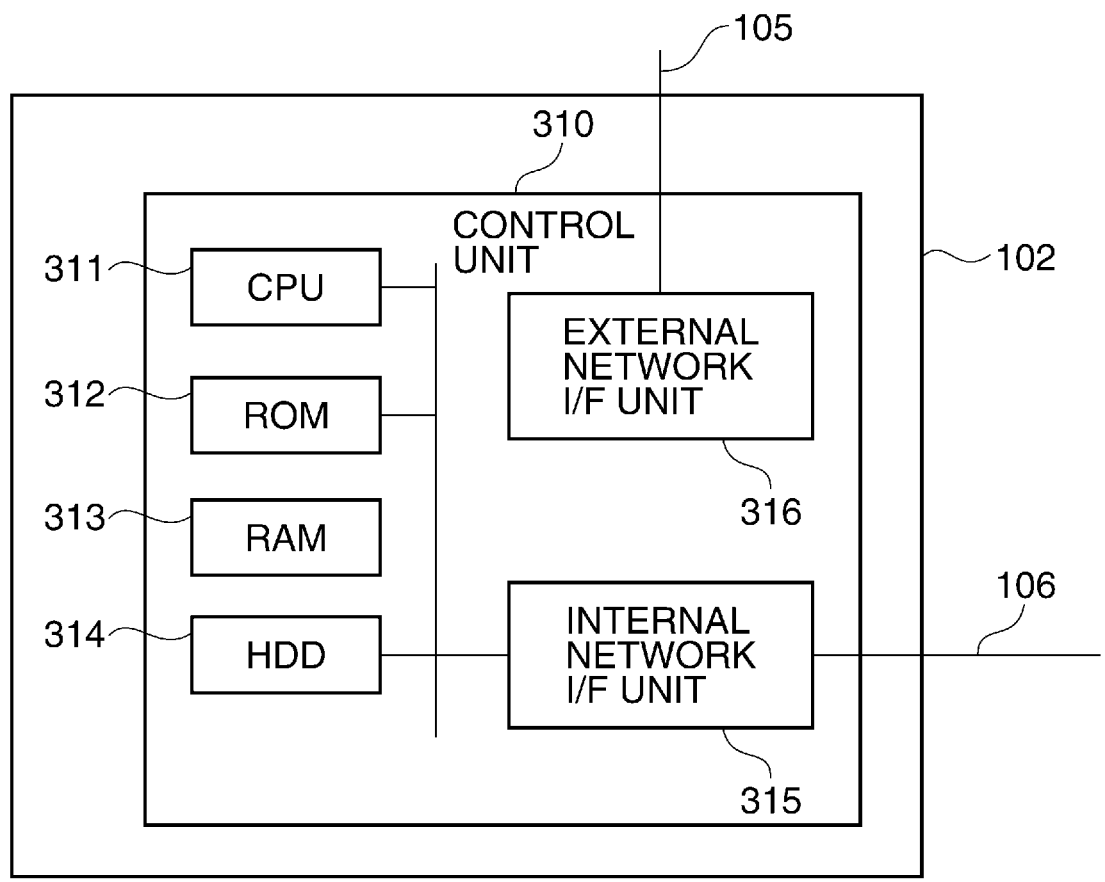
FIG. 3 is a block diagram schematically showing a configuration of an image generation server shown in FIG. 1.

FIG. 3 is a block diagram schematically showing a configuration of the image generation server 102 shown in FIG. 1. A control unit 310 in the image generation server 102 has a CPU 311, a ROM 312, a RAM 313, a hard disk drive (HDD) 314, an external network I/F unit 316, and an internal network I/F unit 315, and controls operations of the entire image generation server 102.

The CPU 311 reads a control program stored in the ROM 312 and executes various control processes. The RAM 313 is used as a main memory of the CPU 311 and a temporary memory area such as a work area. The HDD 314 stores image data and various programs. Moreover, the internal network I/F unit 315 connects the control unit 310 to the local network 106. The external network I/F unit 316 connects the control unit 310 to other information processing apparatuses connected to the LAN 105.

Figure 4:
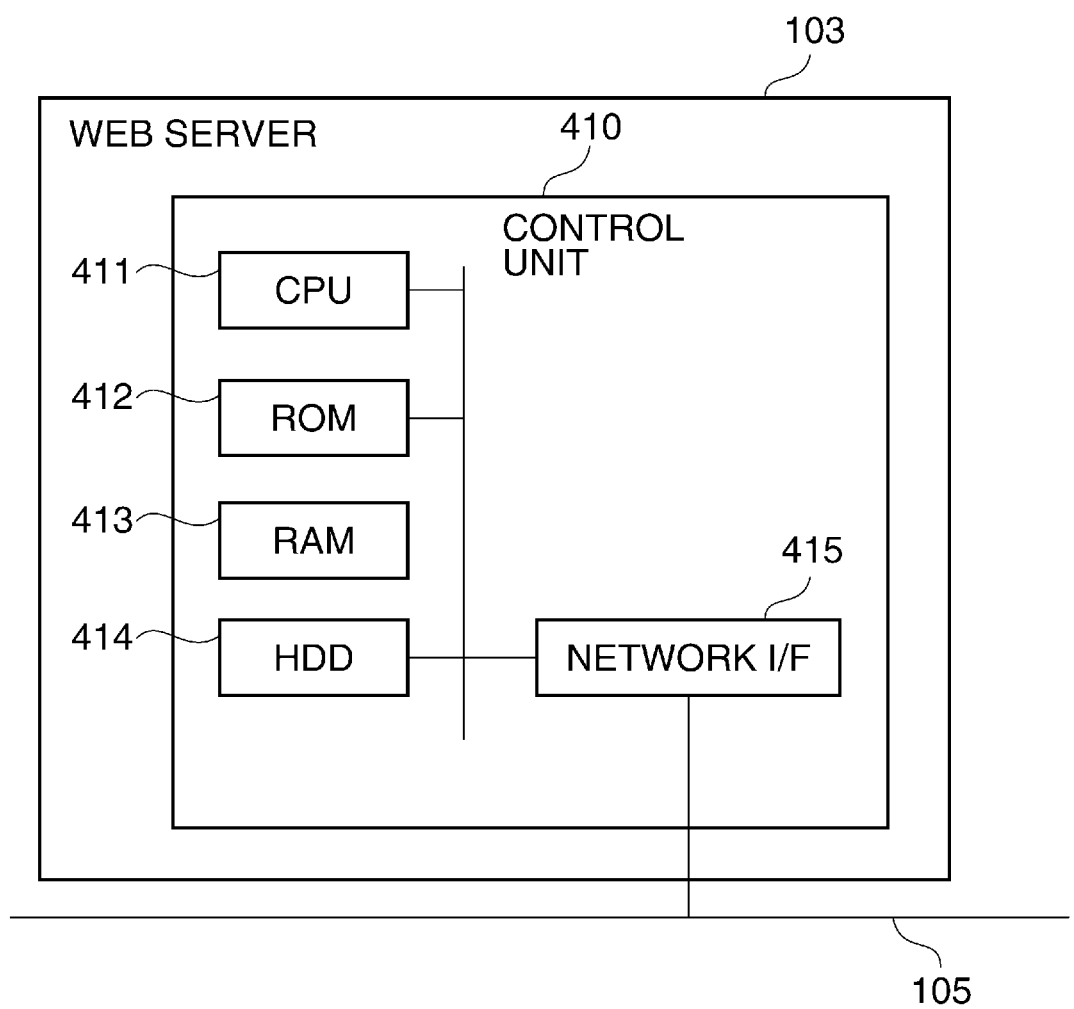
FIG. 4 is a block diagram schematically showing a configuration of a Web server shown in FIG. 1.

FIG. 4 is a block diagram schematically showing a configuration of the Web server 103 shown in FIG. 1. A control unit 410 in the Web server 103 has a CPU 411, a ROM 412, a RAM 413, a hard disk drive (HDD) 414, and a network I/F unit 415, and controls operations of the entire Web server 103.

The CPU 411 reads a control program stored in the ROM 412 and executes various control processes. The RAM 413 is used as a main memory of the CPU 411 and a temporary memory area such as a work area. The HDD 414 stores image data and various programs. The network I/F unit 415 connects the control unit 410 to the LAN 105.

Figure 5:
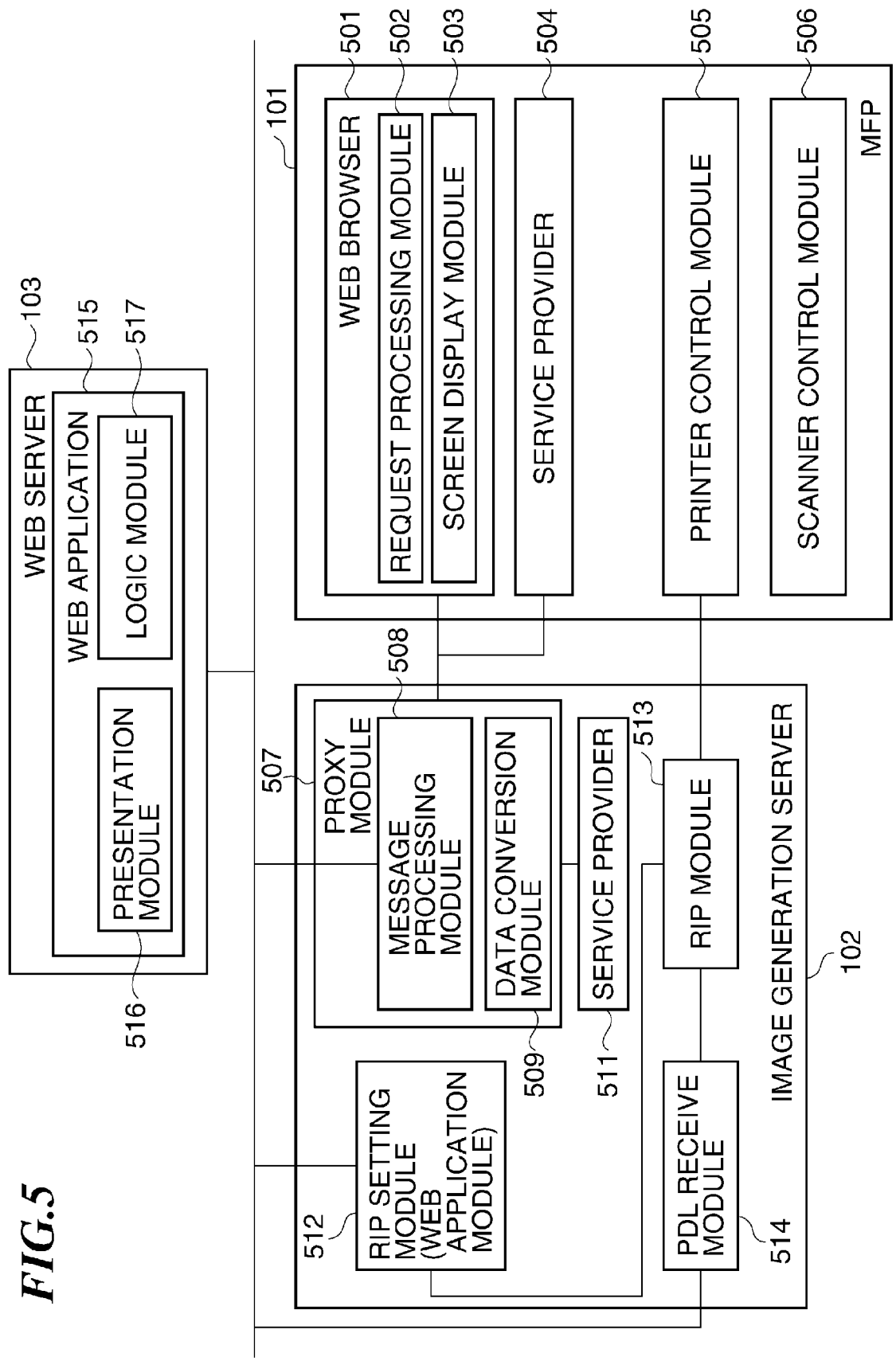
FIG. 5 is a view showing a software configuration of the entire information processing system shown in FIG. 1.

FIG. 5 is a view showing a software configuration of the entire information processing system shown in FIG. 1. The MFP 101, the image generation server 102, and the Web server 103 correspond to those shown in FIG. 1, respectively. It should be noted that software functions shown in FIG. 5 are achieved when the CPU of the MFP 101 in FIG. 2, the CPU of the image generation server 102 in FIG. 3, and the CPU of the Web server 103 in FIG. 4 execute control programs.

As shown in FIG. 5, the MFP 101 is equipped with a Web browser 501, a service provider 504, a printer control module 505, and a scanner control module 506.

The Web browser 501 includes a request processing module 502 and a screen display module 503. The request processing module 502 requests screen information that is displayed on the screen display module 503 from a presentation module 516 of the Web server 103 according to the HTTP protocol.

Here, the request processing module 502 communicates with the presentation module 516 via a proxy module 507. More specifically, the request processing module 502 requests operation screen information of the MFP that is displayed by the Web browser 501 from the proxy module 507, and notifies the proxy module 507 of instructions from a user inputted through an operation screen displayed on the screen display module 503.

Moreover, the request processing module 502 analyzes the HTML file received from the proxy module 507. This HTML file contains a description showing contents of the operation screen that should be displayed on the Web browser 501. The screen display module 503 displays the operation screen on the operation unit 202 of the MFP 101 based on the analyzed result by the request processing module 502.

The service provider 504 makes functions of the MFP 101 available for the Web server 103 on the network. For example, a function for converting a paper original into electronic data by the scanner control module 506 and for transmitting the data to another information processing apparatus becomes available.

The printer control module 505 controls the printer unit 204 to output the image data for printing that has been generated by a RIP module 513 in the image generation server 102 onto a paper medium.

Moreover, the image generation server 102 is equipped with the proxy module 507, a RIP setting module 512, a service provider 511, a PDL receive module 514, and a RIP module 513.

The proxy module 507 receives a processing request from the Web browser 501 or the service provider 504 of the MFP 101. This processing request is analyzed by a message processing module 508. And the proxy module 507 updates the request by a data conversion module 509 according to a message content, and issues a request to the Web server 103 on the LAN 105 as mentioned later. Moreover, the proxy module 507 edits a response from the Web server 103 against the request to the Web server 103 using a method mentioned later, and then transmits the response to the Web browser 501 of the MFP 101.

The PDL receive module 514 receives printing data in a PDL (Printer Description Language) from a print application on a network (not shown), and transmits it to the RIP module 513.

The RIP module 513 converts the received printing data into the image data that the MFP 101 is possible to output, and transmits it to the printer control module 505.

The RIP setting module 512 is a Web application that sets up an operation of the RIP module 513. The RIP module 513 operates according to the setting detail set up by the RIP setting module 512. In this embodiment, since the RIP setting module 512 consists of Web applications, a user can access the RIP setting module 512 through the Web browser 501, and can set up the operation of the RIP module 513.

The service provider 511 makes the functions of the image generation server 102 available for the outside as an API (Application Program Interface). For example, a transmitting destination address search function about electronic data becomes available.

Moreover, the Web server 103 is equipped with a Web application 515. The Web application 515 includes a presentation module 516 and a logic module 517.

The presentation module 516 generates operation screen information that is displayed on the Web browser 501 of the MFP 101 in response to the processing request from the proxy module 507, and transmits it. Moreover, the presentation module 516 receives an instruction from a user inputted through the operation screen displayed on the Web browser 501 of the MFP 101 from the proxy module 507.

When receiving the instruction from the user, the Web application 515 executes various processes according to the contents of the instruction, and is able to request the service provider 504 of the MFP 101 to execute a process. At this time, the processing request to the service provider 504 is transferred via the proxy module 507.

Specifically, the Web application 515 is possible to request the service provider 504 to execute the printing process by the printer control module 505 of the MFP 101, to execute the paper-original read process by the scanner control module 506, or to execute the transmitting process to a file server (not shown) on the LAN 105 etc.

Thus, when the execution of process is requested to the MFP 101, the logic module 517 requests the service provider 504 included in the MFP 101 to execute the process.

Figure 6:
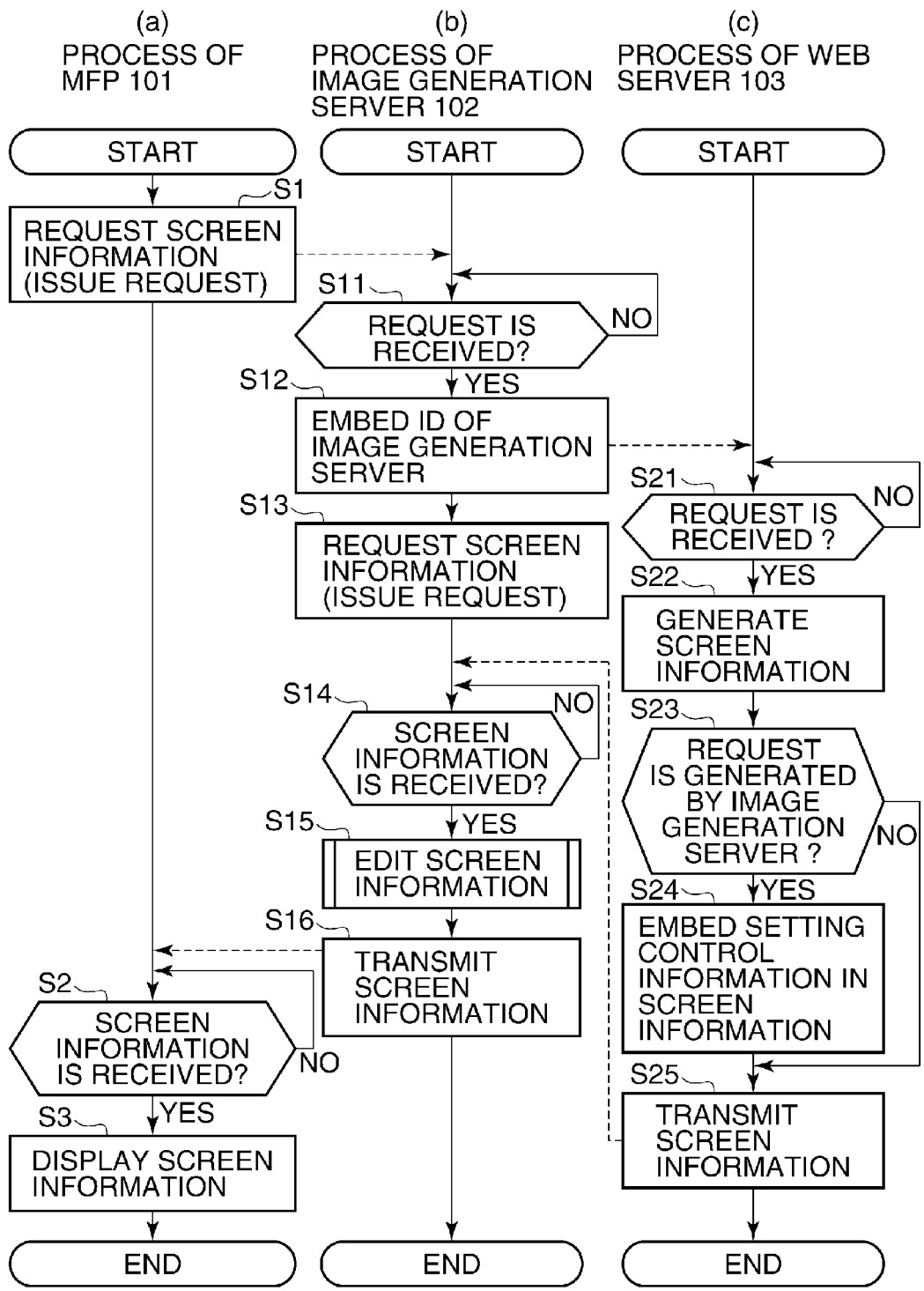
FIG. 6 is a flowchart showing a display procedure of screen information in the information processing system in FIG. 1.

The operations of the information processing system having the above-mentioned configuration will be described. FIG. 6 is a flowchart showing a display procedure of screen information in the information processing system in FIG. 1. In FIG. 6, (a) shows a process of the MFP 101, (b) shows a process of the image generation server 102, and (c) shows a process of the Web server 103. Here, the Web browser 501 requests screen information that should be displayed on the screen display module 503 from the Web server 103. The Web server 103 generates an HTML file that is the screen information requested. The proxy module 507 of the image generation server 102 relays communications between the Web server 103 and the MFP 101, embeds URL information for accessing the RIP setting module 512 in the HTML file, and allows access to this URL by the operation from the screen display module 503.

Specifically, the request processing module 502 of the Web browser 501 requests the screen information that should be displayed on the screen display module 503 from the proxy module 507 at the time of starting the MFP 101 (step S1).

When receiving this request (HTTP request), the message processing module 508 in the proxy module 507 analyzes this request (step S11). The data conversion module 509 embeds identification information of the image generation server 102 in this HTTP request (step S12). And the message processing module 508 transmits the HTTP request changed by the data conversion module 509 to the Web server 103 (step S13).

Here, the embedding of the identification information in the HTTP request shown in the step S12 can be achieved by embedding an identifier in a header section of the HTTP request or by transmitting the URL in which an identifier is embedded. It should be noted that this embodiment describes the example that embeds an identifier in a User-Agent attribute of the HTTP request header.

FIG. 7A and FIG. 7B are views showing examples of HTTP requests issued by the Web browser in FIG. 5 where identifiers are embedded in User-Agent attributes of headers thereof. FIG. 7A shows the HTTP request transmitted from the request processing module 502. FIG. 7B shows the HTTP request rewritten by the data conversion module 509. In the HTTP request in FIG. 7A, as shown by a reference numeral 1201, the identification information "MFP" that is an identifier of the MFP 101 is embedded. Moreover, in the HTTP request in FIG. 7B, as shown by a reference numeral 1202, the identifier "RIPServer1" that has been rewritten by the data conversion module 509 is embedded.

When receiving the HTTP request generated in the step S13 (step S21), the presentation module 516 of the Web server 103 generates display information (HTML) that is displayed on the screen display module 503 (step S22).

Furthermore, the presentation module 516 determines whether this HTTP request has been generated by the image generation server 102 (step S23). This can be determined based on the User-Agent attribute of the HTTP request header, as mentioned above.

When it is determined that the HTTP request has been generated by the image generation server 102 in the step S23, the presentation module 516 embeds setting control information for setting the image generation server in the screen information (HTML) (step S24).

FIG. 8A is a view showing an HTML file generated by the Web server in FIG. 5. FIG. 8A shows an example of the HTML file generated by the presentation module 516 in the step S24. As shown by a reference numeral 1001, a user interface control is added using a DIV tag and CLASS property of the HTML of this section.

Moreover, a reference numeral 1002 shows an area where a Web server that is referred to when this button is pushed is written using the A-tag (hyperlink) of the HTML format. It should be noted that the HREF property as the reference attribute of the A-tag is blank as shown by the reference numeral 1002 in the step S24. That is, this HTML file is the screen information that can be changed by the image generation server 102.

The presentation module 516 transmits the HTML file generated in the step S24 to the message processing module 508 (step S25). Then, the Web server 103 finishes the process.

On the other hand, when it is determined that the request has not been generated by the image generation server 102 in the step S23, the presentation module 516 transmits the screen information generated in the step S22 in step S25. In this case, the screen information is an HTML file that is generated by deleting the content of the DIV tag shown by the reference numeral 1001 from the HTML file shown in FIG. 8A. Then, the Web server 103 finishes the process.

In the image generation server 102, the message processing module 508 in the proxy module 507 receives the screen information issued in the step S25 (step S14). Then, the data conversion module 509 in the proxy module 507 edits the HTML file (step S15).

Figure 9:
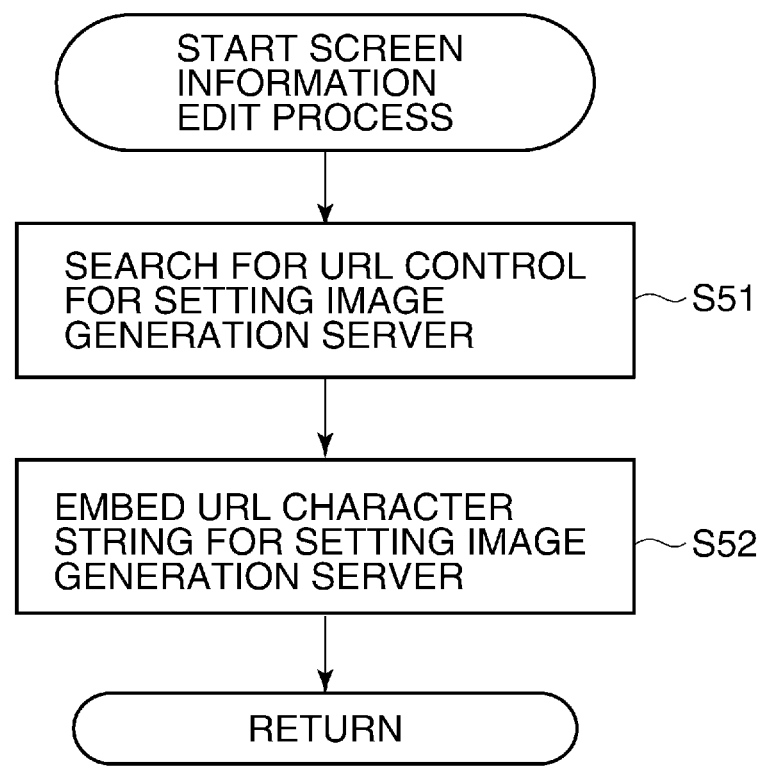
FIG. 9 is a flowchart showing a screen information edit process in step S15 in FIG. 6.

FIG. 9 is a flowchart showing the screen information edit process in the step S15 in FIG. 6. The data conversion module 509 searches the HTML file generated in the step S24 for the tag identified by the class attribute in the DIV tag shown by the reference numeral 1001 (step S51). That is, the data conversion module 509 searches for the URL control for setting the image generation server 102. And the data conversion module 509 embeds the URL information of the RIP setting module 512 in the A property in the searched tag (step S52). That is, the data conversion module 509 embeds the URL character string for setting the image generation server 102. Then, the image generation server 102 returns to the original process.

FIG. 8B shows an example of the HTML file rewritten by the data conversion module 509 in the step S52. In FIG. 8B, as shown by a reference numeral 1003, the URL information "http://RIPServer1.xxx.yyy.zzz" that is URL information of the RIP setting module 512 is embedded in the attribute of the A-tag.

The message processing module 508 transmits the HTML file generated in the step S52 to the request processing module 502 of the Web browser 501 (step S16). Then, the image generation server 102 finishes the process.

When receiving this HTML file, the request processing module 502 analyzes the HTML file (step S2). The screen display module 503 displays this screen information on the operation unit 202 (step S3). Then, the MFP 101 finishes the process.

Figure 10A:
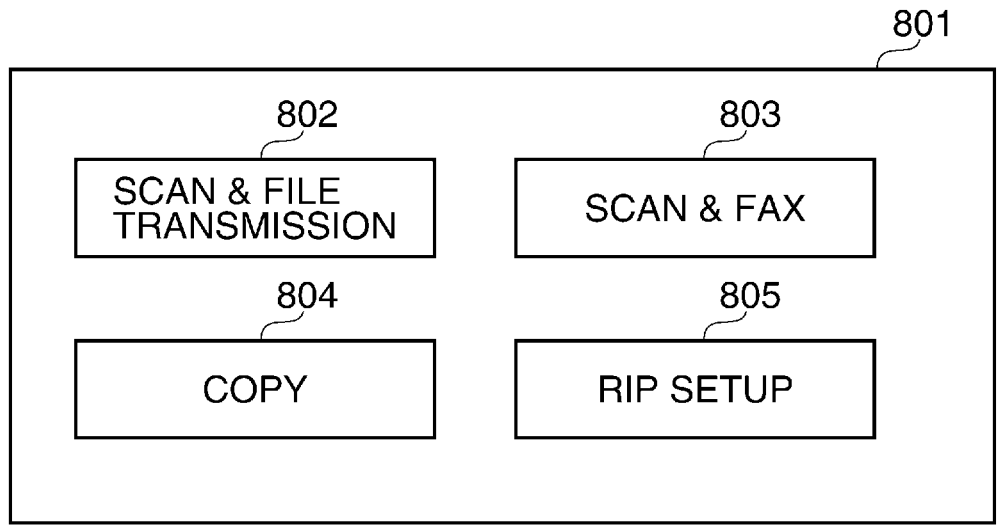
FIG. 10A and FIG. 10B are views showing examples of a user interface displayed on an operation unit of the MFP by a screen display module in step S3 in FIG. 6.
Figure 10B:
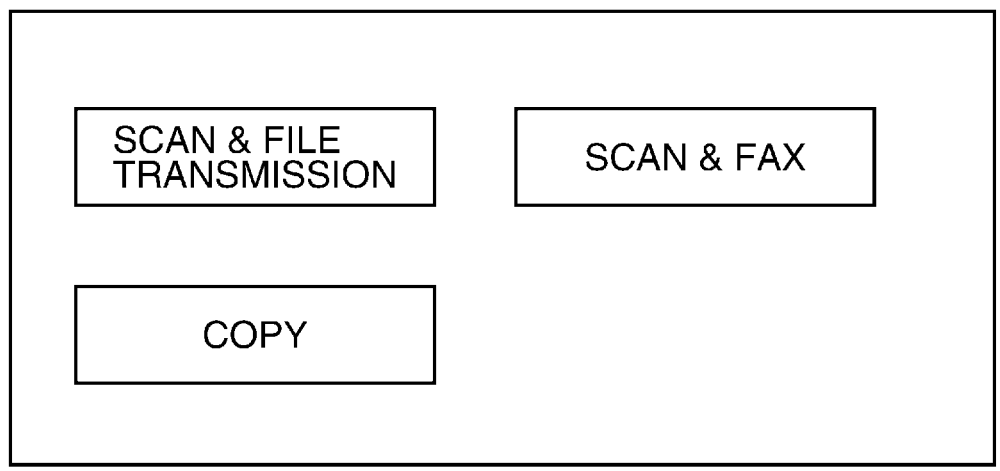

FIG. 10A and FIG. 10B are views showing examples of a user interface displayed on the operation unit 202 by the screen display module 503 in the step S3 in FIG. 6. These screens are displayed on the operation unit 202 of the MFP 101 by interpreting the HTML file generated in the step S52 by the request processing module 502.

In FIG. 10A, a screen 801 is displayed on the operation unit 202 of the MFP 101. Moreover, buttons 802, 803, and 804 for instructing executions of functional processes of the MFP 101 are arranged in the screen 801. When depressing each of the buttons, the operation unit 202 displays an user interface in a second layer to achieve the function.

Moreover, a RIP setup button 805 concerning the present invention is arranged in the screen 801. When depressing the button 805, the Web browser 501 accesses the RIP setting module 512, and an operation setting of the RIP module 513 through the Web browser becomes possible. Moreover, the button 805 corresponds to the control shown by the reference numeral 1001 in FIG. 8A in the HTML file. When this button 805 is depressed, the MFP 101 connects with a resource identified by the URL shown by the reference numeral 1003 in FIG. 8B.

FIG. 10B shows a screen generated when it has not been determined that the image information request has been generated by the image generation server 102 in the step S23. The RIP setup button 805 is not arranged on this screen. That is, when the screen information request is directly transferred to the Web server 103 from the Web browser 501 without passing through the proxy module 507, the screen shown in FIG. 10B is displayed.

Figure 11:
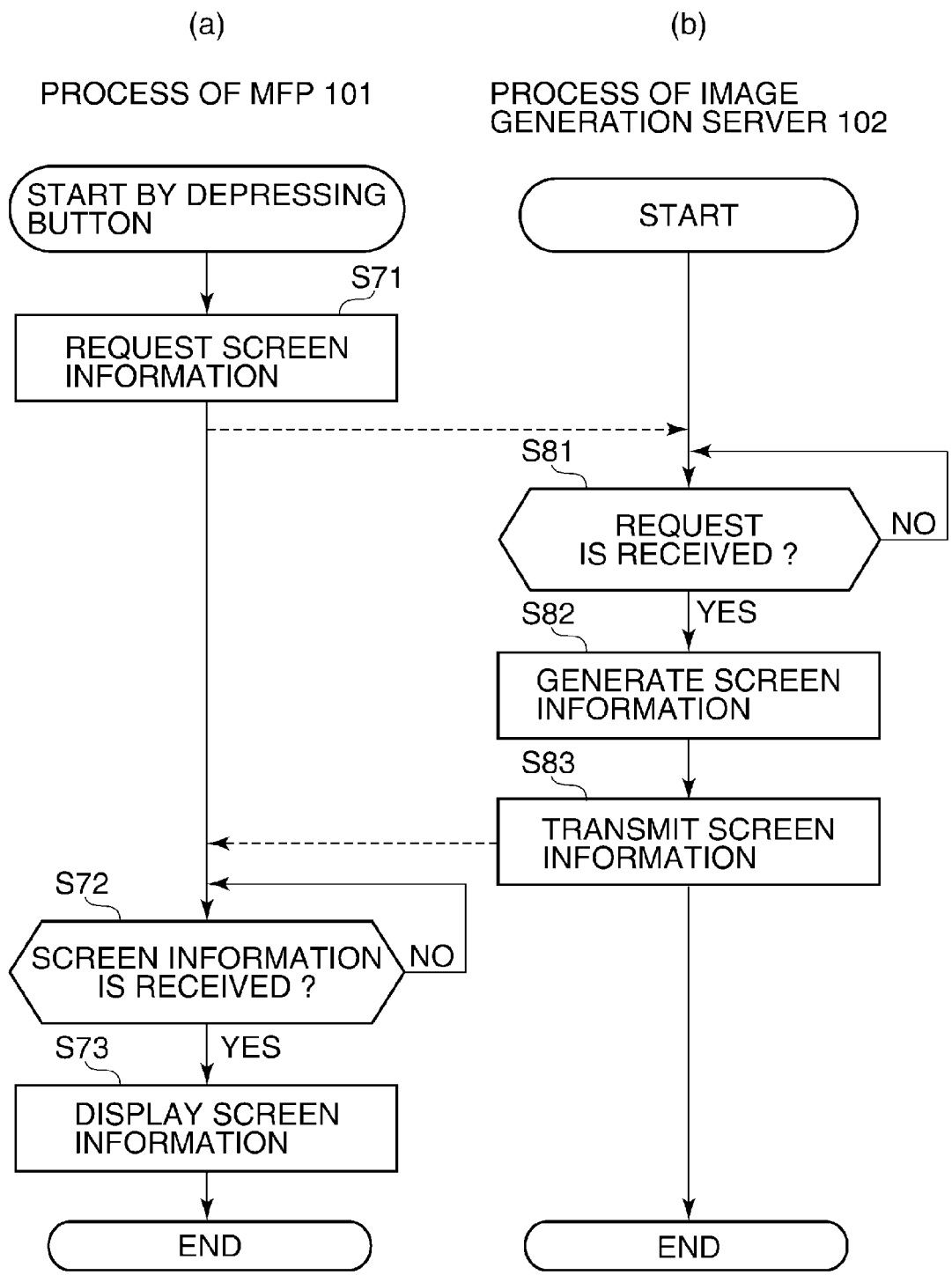
FIG. 11 is a flowchart showing a display procedure of screen information when a RIP setup button in the user interface shown in FIG. 10A has been depressed.

FIG. 11 is a flowchart showing a display procedure of the screen information when the RIP setup button 805 in the user interface shown in FIG. 10A has been depressed. In FIG. 11, (a) shows a process of the MFP 101 and (b) shows a process of the image generation server 102. When the RIP setup button 805 is depressed, the request processing module 502 of the Web browser 501 issues a screen request (step S71). A URL of a connection destination of this screen request becomes the RIP setting module 512 according to the HTML shown by the reference numeral 1003 in FIG. 8B.

When receiving the screen request (step S81), the RIP setting module 512 of the image generation server 102 generates an HTML file as screen information (step S82). The RIP setting module 512 transmits the generated HTML file to the request processing module 502 (step S83). Then, the image generation server 102 finishes the process.

On the other hand, when receiving the screen information (step S72), the request processing module 502 of the MFP 101 interprets the HTML file, and the screen display module 503 displays the interpreted result on the operation unit 202 (step S73). Then, the MFP 101 finishes the process.

Figure 12:
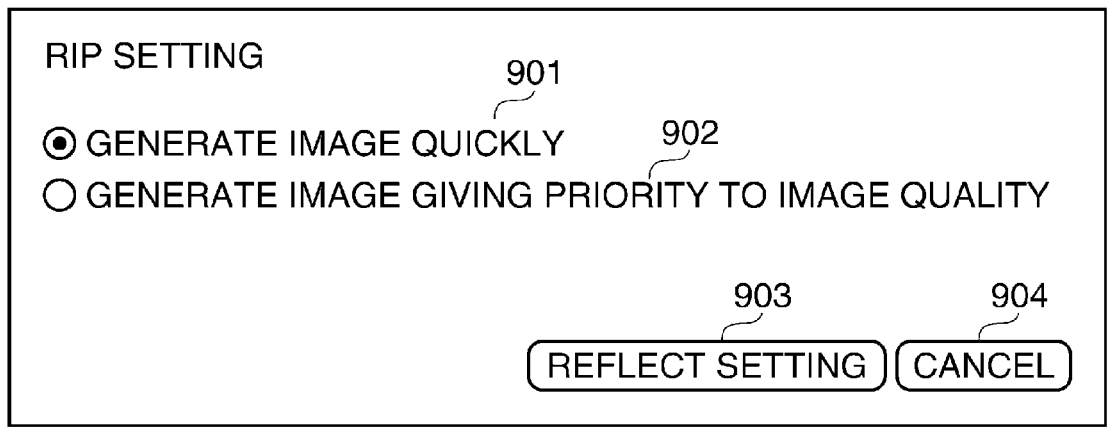
FIG. 12 is a view showing a screen displayed by a screen display module in step S73 in FIG. 11.

FIG. 12 is a view showing a screen displayed by the screen display module 503 in the step S73 in FIG. 11. The screen is displayed on the operation unit 202 of the MFP 101 by interpreting the HTML file, which is generated by the RIP setting module 512 in the step S82, by the request processing module 502.

Controls 901 and 902 set up the operation of the RIP module 513. In this embodiment, the controls 901 and 902 show that image quality of the image data that is generated by the RIP module 513 using printing data received by the PDL receive module 514 can be selected. That is, two operational modes of the RIP module 513 shown by the controls 901 and 902 can be selected. Specifically, the control 901 enables the RIP module 513 to set up a "generate image quickly" mode. On the other hand, the control 902 enables the RIP module 513 to set up a "generate image giving priority to image quality" mode.

A button 903 is used to reflect the setting selected by the controls 901 and 902 to the operation of the RIP module 513. After depressing the button 903, the RIP module 513 will operate according to the setting selected by the controls 901 and 902. A depression of a cancel button 904 can cancel the change of setting selected by the controls 901 and 902.

Thus, according to the information processing system of the first embodiment, the Web browser 501 can interpret the HTML file of the screen constitution that has been generated by the Web server 103, and the user can set the operation of the RIP module 513 through the Web browser 501.

Moreover, the image generation server 102 receives the screen information transmitted from the Web server 103, and changes the screen information that is displayed on the MFP 101. In this case, the Web server 103 generates the entire screen information that is displayed on the MFP 101. Moreover, the image generation server 102 is able to change the screen information into information inherent in the image generation server 102. Accordingly, the flexibility of constructing the Web server 103 is maintained and the load on the Web server 103 is reduced. Moreover, the change of the screen information transmitted from Web server 103 enables the screen information to improve flexibility. Moreover, the screen information generated by the Web server 103 can be changed easily corresponding to the function of the image generation server 102. Moreover, the Web server 103 can generate screen information suitable for the function of the image generation server 102 that is a transmitting source. Moreover, the user can use the function of the image generation server 102 from the screen of the MFP 101. Moreover, since all the screen operations can be performed from the operation unit of the MFP 101, operability is improved. Moreover, data can be transferred at high speed between the MFP 101 and the image generation server 102.

Figure 13:
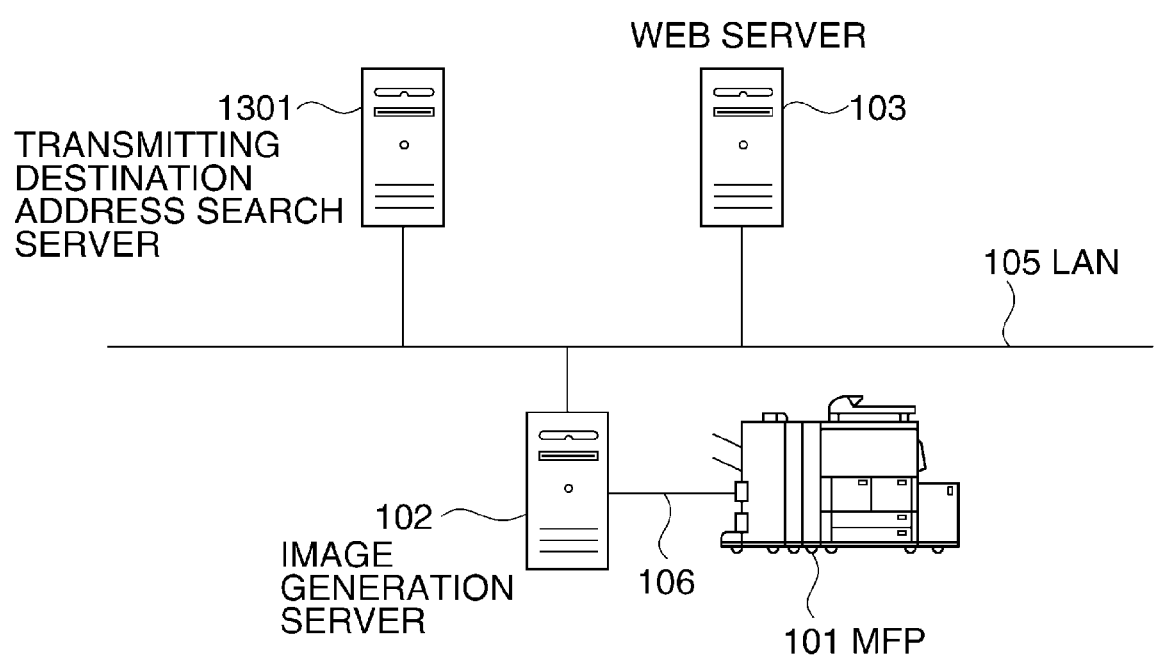
FIG. 13 is a view showing the entire configuration of an information processing system according to a second embodiment of the present invention.

FIG. 13 is a view showing the entire configuration of an information processing system according to a second embodiment of the present invention. The same reference number is attached to the same configuration member as that in the first embodiment, and the duplicated description is omitted.

In the second embodiment, there is a transmitting destination address search server 1301 on the network for determining a destination address to which electronic data is transmitted from the MFP 101. This transmitting destination address search server 1301 cooperates with the MFP 101, the image generation server 102, and the Web server 103.

FIG. 14A, FIG. 14B, FIG. 14C, FIG. 14D, FIG. 14E, and FIG. 14F are views showing screen information displayed on the operation unit 202. The Web browser 501 in the second embodiment displays the screen information shown in FIG. 10A and FIG. 14A through FIG. 14F.

A change of the screen displayed by the Web browser 501 will be described using FIG. 10A and FIG. 14A through FIG. 14F. When depressing the "scan & file transmission" button 802 in the screen in FIG. 10A that the Web browser 501 displays, the screen information shown in FIG. 14A is generated.

Figure 14A:
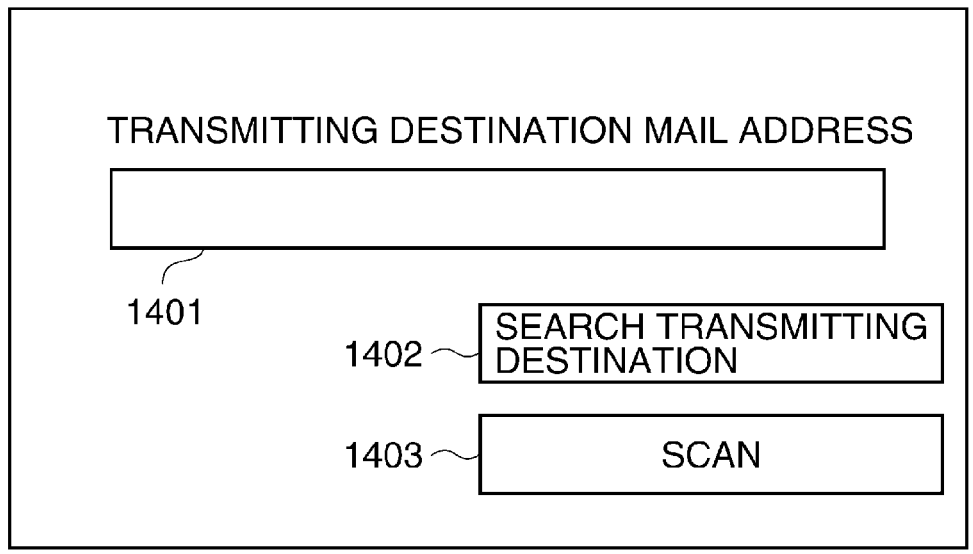
FIG. 14A, FIG. 14B, FIG. 14C, FIG. 14D, FIG. 14E, and FIG. 14F are views showing screen information displayed on an operation unit of an MFP in FIG. 13.

A "scan" button 1403 is arranged in a screen shown in FIG. 14A. When depressing this button 1403, the scanner control module 506 scans a paper original that is set in the MFP 101, and transmits its electronic data to a transmitting destination that is displayed in a transmitting destination mail address field 1401.

Here, a transmitting destination mail address can be searched using the transmitting destination address search server 1301 or the service provider 511 of the image generation server 102. A transmitting destination mail address is set using the screen in FIG. 14B displayed by depressing a "search transmitting destination" button 1402.

Figure 14B:
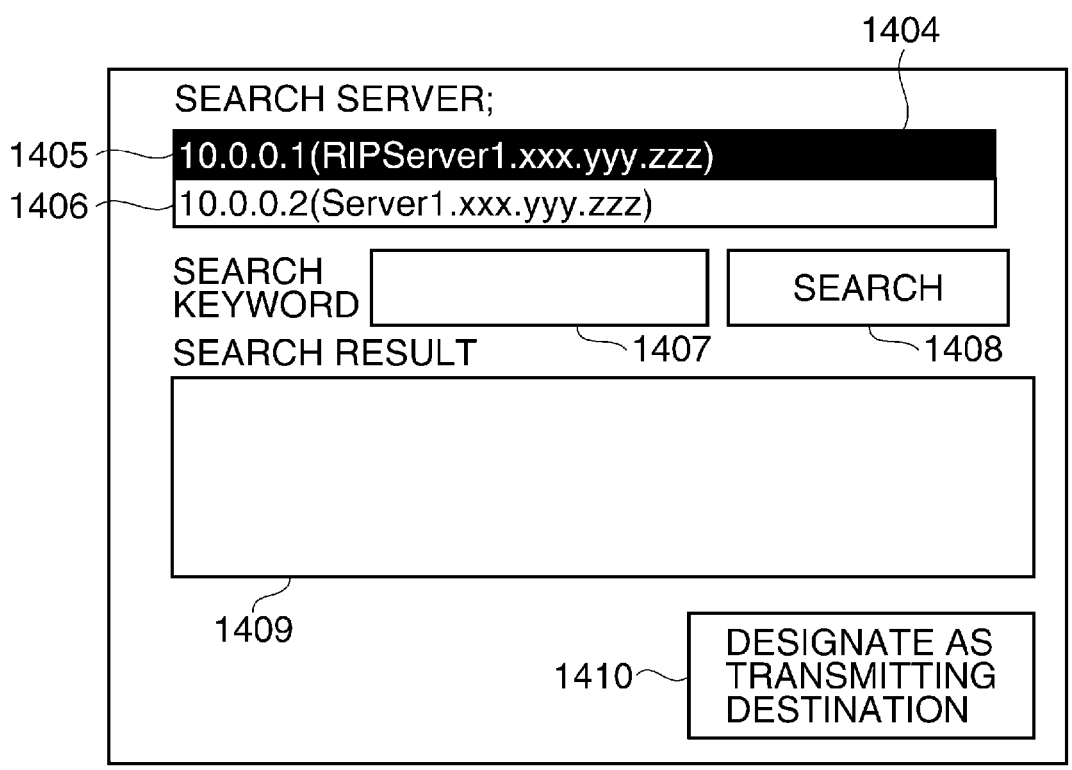

A list of available destination search servers is displayed in a search server list field 1404 in the screen in FIG. 14B. In this example, two destination search servers 1405 and 1406 are listed. In this embodiment, the destination search server 1405 is equivalent to the image generation server 102, and the destination search server 1406 is equivalent to the transmitting destination address search server 1301.

In the screen in FIG. 14B, when operating the operation screen of the MFP 101, a user inputs a search keyword of a destination address into a search keyword input field 1407. When a search button 1408 is depressed after inputting the search keyword, the destination search server selected in the search server list field 1404 searches a transmitting destination.

Furthermore, destinations in agreement with the search keyword in the search keyword input field 1407 are listed in a search result list field 1409 as a search result.

Figure 14C:
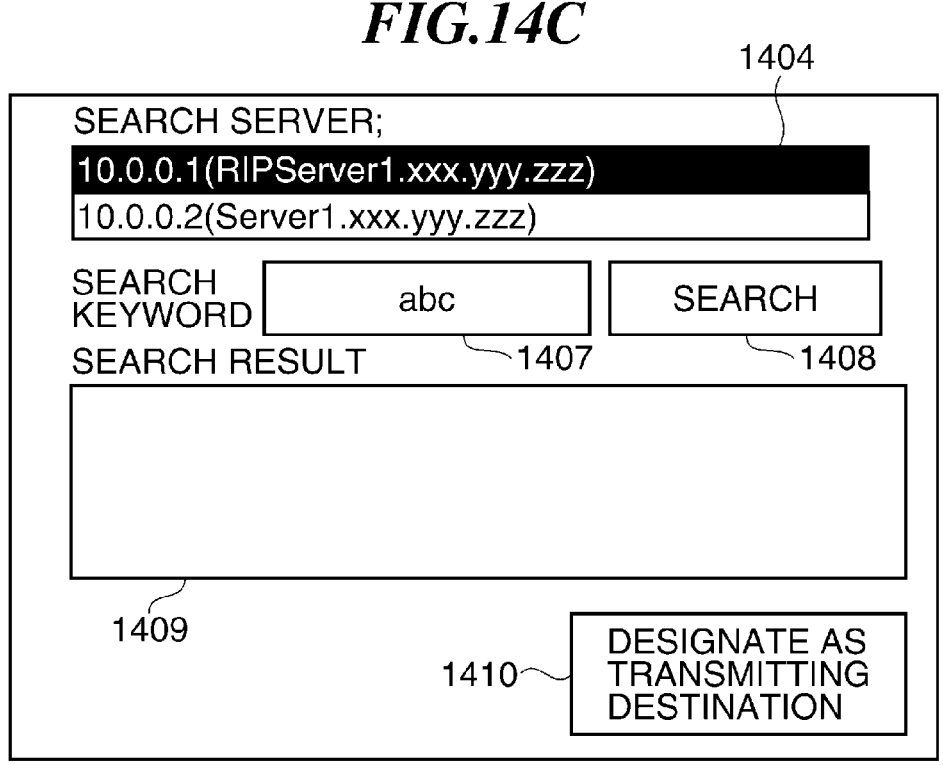

The screen in FIG. 14B shows that the user selects "RIPServer1.xxx.yyy.zzz" that is the image generation server 102 as the destination search server in the search server list field 1404. Furthermore, a screen in FIG. 14C shows that the user inputs "abc" as the search keyword in the search keyword input field 1407. Then, when the user depresses the search button 1408, mail addresses 1412 and 1413 in agreement with the search keyword are listed in a search result list field 1409 as shown in a screen in FIG. 14D.

Figure 14D:
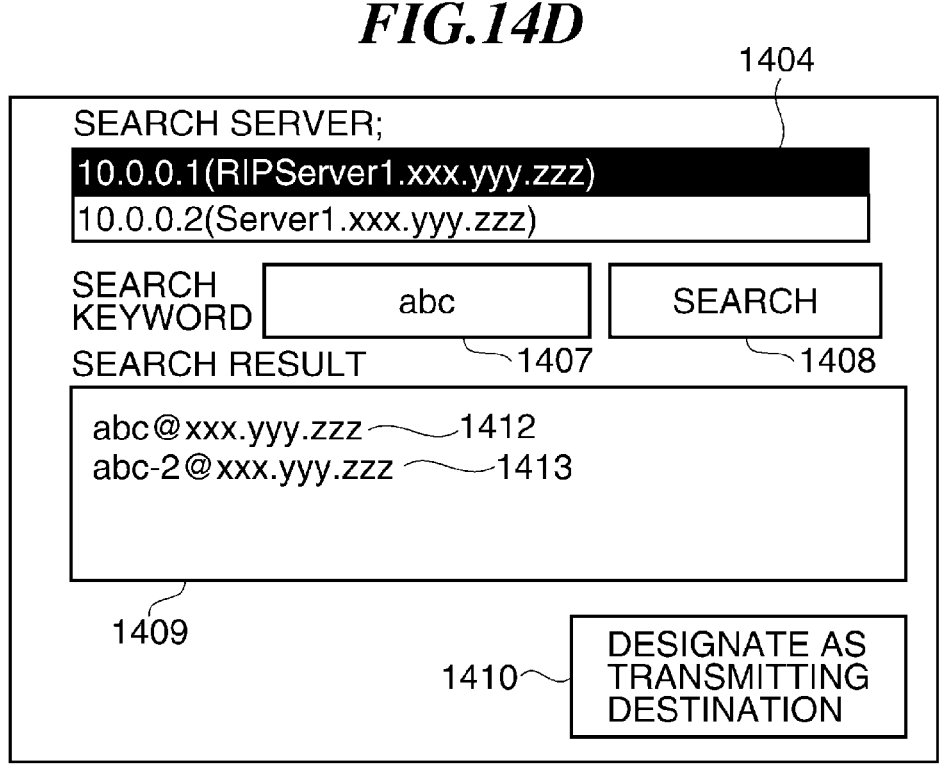
Figure 14E:
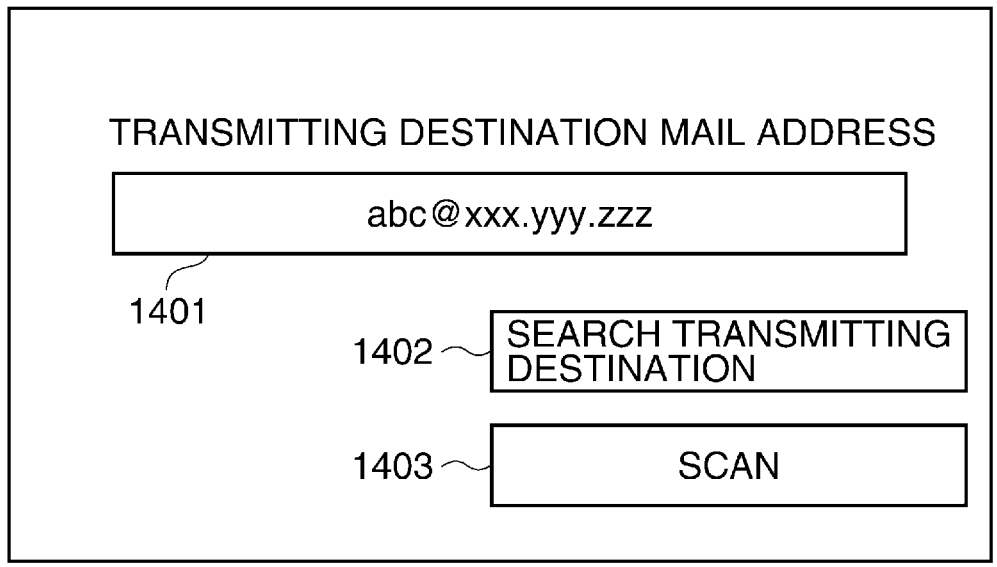

In the screen in FIG. 14D, when the user selects desired mail address from the list in the search result list field 1409 and depresses a "designate as transmitting destination" button 1410, the transmitting destination mail address is set in the transmitting destination mail address field 1401 as shown in a screen in FIG. 14E.

Figure 14F:

And when the user depresses the "scan" button 1403 in the screen in FIG. 14E, the paper original is scanned, and a result screen shown in FIG. 14F is displayed.

FIG. 15 is a flowchart showing a display procedure of screen information when the "search transmitting destination" button 1402 in the screen shown in FIG. 14A has been depressed. In FIG. 15, (a) shows a process of the MFP 101, (b) shows a process of the image generation server 102, and (c) shows a process of the Web server 103.

In the MFP 101, when the "search transmitting destination" button 1402 is depressed, the request processing module 502 of the Web browser 501 requests screen information (step S101).

When receiving this screen information request, the message processing module 508 of the image generation server 102 transfers this request to the Web server 103 (step S111).

When receiving this screen information request, the presentation module 516 of the Web server 103 generates the HTML file corresponding to the screen information in FIG. 14B (step S121), and transmits it to the message processing module 508 (step S122). It should be noted that the address of the service provider 511 is not included in the HTML file at this time, and the HTML file corresponding to the screen information in FIG. 14B is completed through a process in step S114 mentioned later. Then, the Web server 103 finishes the process.

The message processing module 508 of the image generation server 102 receives the HTML file that has been generated by the presentation module 516 (step S112). And the message processing module 508 searches this HTML file for a user interface control (a list control) that is listing the destination search servers (step S113).

Furthermore, the data conversion module 509 adds the address of the service provider 511 to the list control (step S114). Here, the service provider 511 has a function to search a destination like the transmitting destination address search server 1301.

The message processing module 508 transmits the HTML file changed by the data conversion module 509 to the request processing module 502 of the Web browser 501 (step S115). Then, the image generation server 102 finishes the process.

When receiving the HTML file that is the screen information generated in the step S121 (S102), the request processing module 502 interprets the HTML file, and displays the screen shown in FIG. 14B on the screen display module 503 (step S103). Then, the MFP 101 finishes the process.

FIG. 16A is a view showing a partial example of the HTML file generated by the Web server 103 in the step S121 in FIG. 15. A content of the DIV tag of the HTML shown by a reference numeral 1601 shows servers that will be listed in the search server list field 1404. Moreover, as shown by a reference numeral 1602, only "Server1.xxx.yyy.zzz" that is the transmitting destination address search server 1301 is listed in an OPTION tag showing list elements.

FIG. 16B is a view showing a partial example of the HTML file generated in the step S114 in FIG. 15. The data conversion module 509 searches the DIV tag mentioned above in the step S113, and adds "RIPServer1.xxx.yyy.zzz" that is an address of the image generation server 102 to the OPTION tag showing the list elements of the destination search servers in the step S114.

Figure 17:
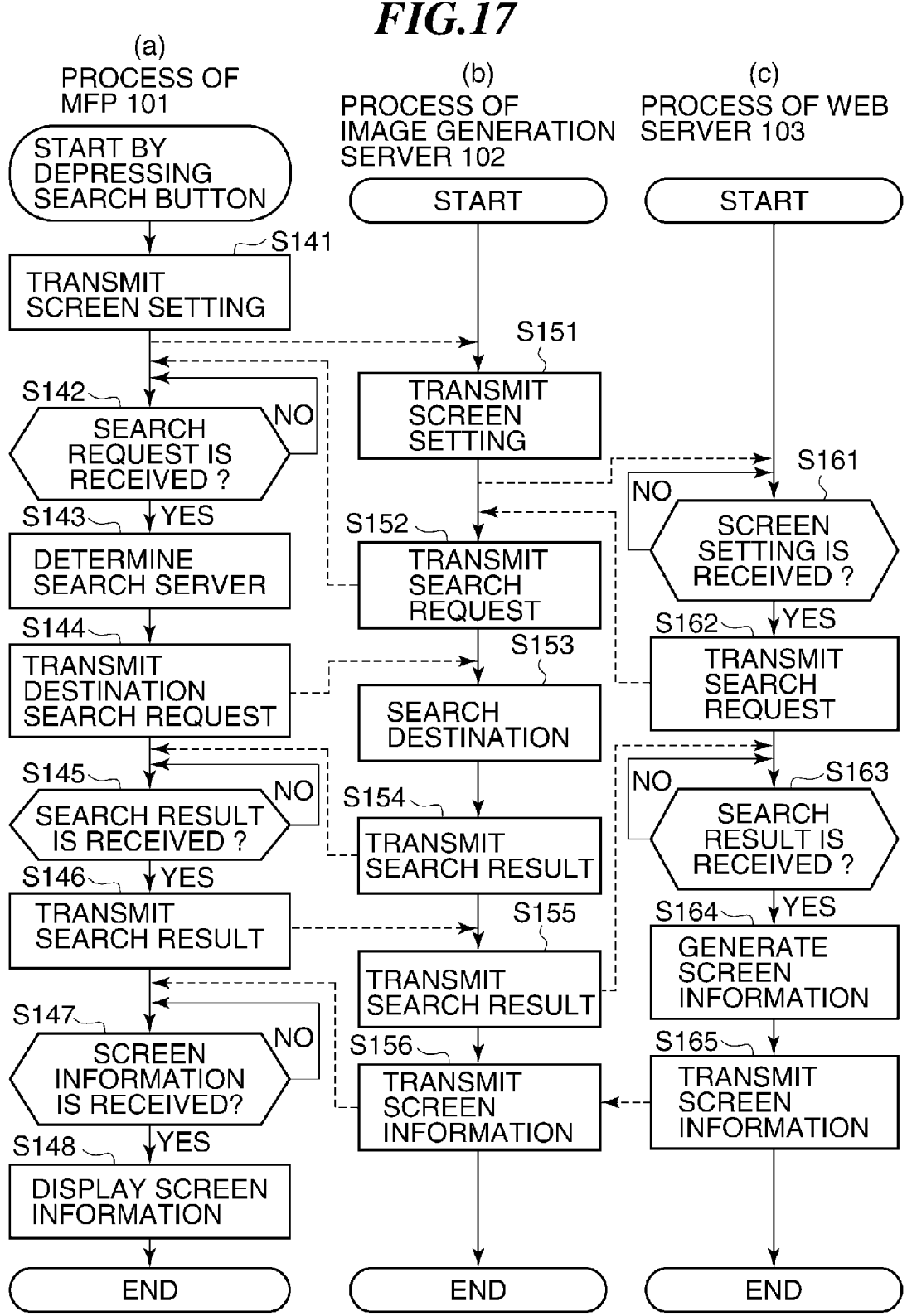
FIG. 17 is a flowchart showing a display procedure of screen information when a keyword of "abc" is inputted into a search keyword input field and a search button in the screen shown in FIG. 14C has been depressed.

FIG. 17 is a flowchart showing a display procedure of screen information when a keyword of "abc" is inputted into the search keyword input field 1407 and the search button 1408 in the screen shown in FIG. 14C has been depressed. In FIG. 17, (a) shows a process of the MFP 101, (b) shows a process of the image generation server 102, and (c) shows a process of the Web server 103.

When the search button 1408 is depressed, the request processing module 502 of the Web browser 501 transmits screen setting information (step S141). This screen setting information means setting values that are set by the screen operation of the MFP 101 in the screen in FIG. 14C, i.e., it means the search keyword "abc" and the name of the destination search server. The following description assumes that the screen setting information has been transmitted by any communications among the MFP 101, the image generation server 102, and the Web server 103.

When receiving the screen setting information, the message processing module 508 of the image generation server 102 transfers this screen setting information to the Web server 103 (step S151).

When receiving the screen setting information (step S161), the logic module 517 of the Web server 103 transmits a search request to the message processing module 508 (step S162).

When receiving the search request, the message processing module 508 transfers the search request to the service provider 504 of the MFP 101 (step S152).

When receiving the search request (step S142), the service provider 504 of the MFP 101 analyzes this search request, and determines a destination search server (step S143). Here, when the image generation server 102 that is the destination search server 1405 in FIG. 14B is selected as a destination search server, the request processing module 502 transmits a destination search request to the service provider 511 of the image generation server 102 (step S144).

When receiving the destination search request, the service provider 511 searches a destination (step S153), and transmits the search result to the service provider 504 (step S154). It should be noted that the result of searching in the step S153 is the list of mail addresses 1412 and 1413 shown in the screen in FIG. 14D.

When receiving the search result (step S145), the service provider 504 of the MFP 101 transmits the search results to the message processing module 508 (step S146).

When receiving the search result, the message processing module 508 transfers the received search result to the logic module 517 (step S155).

When the logic module 517 receives the search result (step S163), the presentation module 516 generates screen information concerning the search result (step S164). The logic module 517 transmits the screen information to the message processing module 508 (step S165). Then, the Web server 103 finishes the process.

The message processing module 508 transfers the screen information to the request processing module 502 (step S156). Then, the image generation server 102 finishes the process.

If this screen information is received (step S147), the request processing module 502 will interpret this received screen information, and will display it by the screen display module 503 (step S148). Then, the MFP 101 finishes the process.

The screen shown in FIG. 14D is displayed in the step S148. In the screen in FIG. 14D, when the mail address 1412 is selected as the search result and when the "designate as transmitting destination" button 1410 is depressed, the screen shown in FIG. 14E is displayed.

FIG. 18 is a flowchart showing a display procedure of screen information when the "scan" button 1403 in the screen shown in FIG. 14E has been depressed. In FIG. 18, (a) shows a process of the MFP 101, (b) shows a process of the image generation server 102, and (c) shows a process of the Web server 103.

When the "scan" button 1403 is depressed, the request processing module 502 of the Web browser 501 transmits screen setting information (step S171). This screen setting information means a setting value that is set by the screen operation of the MFP 101 in the screen in FIG. 14E, i.e., it means the transmitting destination mail address. The following description assumes that the screen setting information has been transmitted by any communications among the MFP 101, the image generation server 102, and the Web server 103.

When receiving the screen setting information, the message processing module 508 of the image generation server 102 transfers this screen setting information (message) to the Web server 103 (step S181).

When the presentation module 516 of the Web server 103 receives the screen setting information (step S191), the logic module 517 issues an execution command for executing the function of the "scan" button 1403 (step S192).

When receiving the execution command, the message processing module 508 transfers this execution command to the service provider 504 of the MFP 101 (step S182).

When the service provider 504 receives this execution command (step S172), the scanner control module 506 scans the paper original set in the MFP 101 (step S173).

The service provider 504 transmits the electronic data scanned to the message processing module 508, and requests to transfer the electronic data to the destination that is shown in the transmitting destination mail address field 1401 as the destination information (step S174).

When receiving the electronic data with the request, the message processing module 508 of the image generation server 102 transmits the electronic data to the address shown in the transmitting destination mail address field 1401 (step S183). Thus, the transmitting process of electronic data is performed by transmitting the electronic data to the mail server shown in the transmitting destination mail address field 1401 via the message processing module 508 in the step S183. Further, when receiving a transmitted result of the electronic data from the destination shown in the transmitting destination mail address field 1401, the message processing module 508 transmits the transmitted result to the service provider 504 in the step S183.

When receiving the transmitted result (step S175), the service provider 504 transfers the transmitted result to the message processing module 508 (step S176). When receiving the transmitted result, the message processing module 508 transfers the received transmitted result to the Web server 103 (step S184). Thus, the transmitted result is transferred to the Web server 103 from the service provider 504 via the message processing module 508.

When receiving the transmitted result (step S193), the presentation module 516 generates screen information concerning the transmitted result (step S194), and transmits this screen information to the message processing module 508 (step S195). Then, the Web server 103 finishes the process.

The message processing module 508 transfers the screen information to the request processing module 502 of the Web browser 501 (step S185). Thus, this screen information is transferred to the request processing module 502 of the Web browser 501 via the message processing module 508.

When receiving the screen information (step S177), the request processing module 502 analyzes the screen information and displays an analyzed result by the screen display module 503 (step S178). At this time, the screen information is displayed as shown in FIG. 14F, for example. This screen shows that the transmission has been normally completed. Then, the MFP 101 finishes the process.

According to the information processing system of the second embodiment, the Web browser 501 interprets the HTML file of the screen configuration that the Web server 103 generated. The user becomes possible to use the function that the service provider 511 of the image generation server 102 provides through the Web browser 501.

The above-mentioned embodiments do not restrict the invention defined by the claims. Furthermore, not all the combinations of the features described in the embodiments are indispensable for the solving means of the invention.

The present invention can be embodied as a system, an apparatus, a method, a program, a storage medium (a recording medium), etc. Specifically, the present invention can be applied to a system that consists of a plurality of devices, or to an apparatus that consists of a single device.

Although the above-mentioned embodiments show the cases where the invention is applied to the printing apparatus that consists of the MFP as an image processing apparatus, the present invention is applicable to various image processing apparatuses such as not only a printing apparatus but a facsimile machine, a scanner, an optical apparatus.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-292789, filed on Dec. 24, 2009, which is hereby incorporated by reference herein in its entirety.

What is claimed is:

1. An information processing system comprising:
an image processing apparatus including:
a first processor connected to a first memory, the first processor and first memory being configured to:
request, via an external control apparatus, an information provision apparatus to provide screen information that is displayed on said image processing apparatus;
receive the screen information that is provided by the information provision apparatus in response to a screen information request via the external control apparatus; and
display the received screen information,
said external control apparatus including:
a second processor connected to a second memory, the second processor and second memory being configured to:
receive the screen information request from said image processing apparatus;
transfer the received screen information request to the information provision apparatus;
receive the screen information transmitted from said information provision apparatus in response to the transferred screen information request;
change the received screen information by adding information for using a function of the external control apparatus; and
transmit the changed screen information to said image processing apparatus,
said information provision apparatus including:
a third processor connected to a third memory, the third processor and third memory being configured to:
receive the screen information request from said image processing apparatus via said external control apparatus;
generate the screen information that is displayed on said image processing apparatus in response to the received screen information request; and
transmit the generated screen information to said external control apparatus,
wherein a Uniform Resource Locator that indicates said external control apparatus is embedded in the received screen information.

2. The information processing system according to claim 1, wherein the Uniform Resource Locator indicates a service provider that makes functions of said external control apparatus.

3. The information processing system according to claim 1, wherein the screen information provided by said information provision apparatus is a user interface displayed on said image processing apparatus.

4. The information processing system according to claim 1, wherein said image processing apparatus is directly connected with said external control apparatus, and is connected to a network via said external control apparatus.

5. An information processing system comprising:
an image processing apparatus including:
a first processor connected to a first memory, the first processor and first memory being configured to:
request, via an external control apparatus, an information provision apparatus to provide screen information that is displayed on said image processing apparatus;
receive the screen information that is provided by the information provision apparatus in response to a screen information request via the external control apparatus; and
display the received screen information,
said external control apparatus including:
a second processor connected to a second memory, the second processor and second memory being configured to:
receive the screen information request from said image processing apparatus;
transfer the received screen information request to the information provision apparatus;
receive the screen information transmitted from said information provision apparatus in response to the transferred screen information request;
change the received screen information by adding information for using a function of the external control apparatus; and
transmit the changed screen information to said image processing apparatus,
said information provision apparatus including:
a third processor connected to a third memory, the third processor and third memory being configured to:
receive the screen information request from said image processing apparatus via said external control apparatus;
generate the screen information that is displayed on said image processing apparatus in response to the received screen information request; and
transmit the generated screen information to said external control apparatus,
wherein the second processor and memory of the external control apparatus are further configured to analyze the received screen information request, and set identification information of said external control apparatus to the analyzed screen information request,
wherein said external control apparatus transfers the screen information request to which the identification information is set to said information provision apparatus, and
wherein the third processor and third memory of said information provision apparatus is further configured to identify a transmitting source of the received screen information request based on the set up identification information, and change the generated screen information according to the identified transmitting source.

6. An external control apparatus that can communicate with an image processing apparatus and an information provision apparatus, comprising:
a first processor connected to a first memory, the first processor and first memory being configured to:
receive a request of screen information that is displayed on the image processing apparatus from the image processing apparatus concerned;
transfer a received screen information request to the information provision apparatus;
receive the screen information transmitted from the information provision apparatus in response to the transferred screen information request;
change the received screen information by adding information for using a function of the external control apparatus; and
transmit the changed screen information to the image processing apparatus,
wherein a Uniform Resource Locator that indicates said external control apparatus is embedded in the received screen information.

7. A control method for an information processing system comprising:
requesting, via an external control apparatus, an information provision apparatus to provide screen information that is displayed on said image processing apparatus;
receiving the screen information that is provided by the information provision apparatus in response to a screen information request via the external control apparatus; and
displaying the received screen information,
which are executed in the image processing apparatus,
receiving the screen information request from the image processing apparatus;
transferring the received screen information request to the information provision apparatus;
receiving the screen information transmitted from the information provision apparatus in response to the transferred screen information request;
changing the received screen information by adding information for using a function of the external control apparatus; and
transmitting the changed screen information to the image processing apparatus,
which are executed in the external control apparatus,
receiving the screen information request from the image processing apparatus via the external control apparatus;
generating the screen information that is displayed on the image processing apparatus in response to the received screen information request; and
transmitting the generated screen information to the external control apparatus,
which are executed in the information provision apparatus,
wherein a Uniform Resource Locator that indicates said external control apparatus is embedded in the received screen information.

8. A non-transitory computer-readable storage medium storing a control program causing a computer to execute a control method for an information processing system, the control method comprising:
requesting, via an external control apparatus, an information provision apparatus to provide screen information that is displayed on said image processing apparatus;
receiving the screen information that is provided by the information provision apparatus in response to a screen information request via the external control apparatus; and
displaying the received screen information,
which are executed in the image processing apparatus,
receiving the screen information request from the image processing apparatus;
transferring the received screen information request to the information provision apparatus;
receiving the screen information transmitted from the information provision apparatus in response to the transferred screen information request;
changing the received screen information by adding information for using a function of the external control apparatus; and
transmitting the changed screen information to the image processing apparatus,
which are executed in the external control apparatus, receiving the screen information request from the image processing apparatus via the external control apparatus;

generating the screen information that is displayed on the image processing apparatus in response to the received screen information request; and transmitting the generated screen information to the external control apparatus, which are executed in the information provision apparatus, wherein a Uniform Resource Locator that indicates said external control apparatus is embedded in the received screen information.

9. A control method for an external control apparatus that can communicate with an image processing apparatus and an information provision apparatus, the method comprising:

receiving a request of screen information that is displayed on the image processing apparatus from the image processing apparatus concerned;

transferring a received screen information request to the information provision apparatus;

receiving the screen information transmitted from the information provision apparatus in response to the transferred screen information request;

changing the received screen information by adding information for using a function of the external control apparatus; and transmitting the changed screen information to the image processing apparatus, wherein a Uniform Resource Locator that indicates the external control apparatus is embedded in the screen information that is received by said information reception step.

10. A non-transitory computer-readable storage medium storing a control program causing a computer to execute a control method for an external control apparatus that can communicate with an image processing apparatus and an information provision apparatus, the method comprising:

receiving a request of screen information that is displayed on the image processing apparatus from the image processing apparatus concerned;

transferring a received screen information request to the information provision apparatus;

receiving the screen information transmitted from the information provision apparatus in response to the transferred screen information request;

changing the received screen information by adding information for using a function of the external control apparatus; and transmitting the changed screen information to the image processing apparatus, wherein a Uniform Resource Locator that indicates the external control apparatus is embedded in the screen information that is received by said information reception step.

* * * * *